US012583727B2

(12) United States Patent
Voit, II

(10) Patent No.: US 12,583,727 B2
(45) Date of Patent: Mar. 24, 2026

(54) AUTOMATED CLEANING SYSTEM FOR A BEVERAGE DISPENSER

(71) Applicant: WELBILT FOODSERVICE COMPANIES, LLC, New Port Richey, FL (US)

(72) Inventor: Hugh Richard Voit, II, Louisville, KY (US)

(73) Assignee: WELBILT FOODSERVICE COMPANIES, L.L.C., New Port Richey, FL (US)

( * ) Notice: Subject to any disclaimer, the term of this patent is extended or adjusted under 35 U.S.C. 154(b) by 180 days.

(21) Appl. No.: 18/299,013

(22) Filed: Apr. 11, 2023

(65) Prior Publication Data

US 2025/0074759 A1 Mar. 6, 2025

(51) Int. Cl.
*B67D 1/07* (2006.01)
*B08B 9/032* (2006.01)

(52) U.S. Cl.
CPC .............. *B67D 1/07* (2013.01); *B08B 9/0321* (2013.01); *B67D 2001/075* (2013.01)

(58) Field of Classification Search
CPC ............ B08B 9/0325; B08B 2209/032; B08B 9/0321; A23G 9/045; A23G 9/30; A47J 31/60; B67D 1/07
See application file for complete search history.

(56) References Cited

U.S. PATENT DOCUMENTS 7,182,017 B1 * 2/2007 Knepler ................ A47J 31/467 99/279

FOREIGN PATENT DOCUMENTS

EP 3067311 A1 * 9/2016 ........... B08B 9/0325

* cited by examiner

*Primary Examiner* — Sharidan Carrillo
(74) *Attorney, Agent, or Firm* — Ohlandt, Greeley and Perle, L.L.P

(57) ABSTRACT

A cleaning system for a beverage dispenser, the system comprising: a water source; a cleaner solution source and/or a sanitizer solution source; at least one cleanable ingredient circuit of the beverage dispenser which is in fluid connection with the water source, and the cleaner solution source and/or sanitizer solution source; a first conduit for connecting the water source to the at least one cleanable ingredient circuit via a sensor; at least one second conduit for connecting the cleaner solution source and/or sanitizer solution source to the first conduit via at least one pump prior to the sensor, thereby forming a mixture of the water, a cleaner solution, and/or a sanitizing solution; and a controller for: (a) receiving a first signal from the sensor representative of electrical conductivity of the mixture, whereby the controller calculates a dilution ratio of the mixture from the electrical conductivity; and/or (b) receiving a second signal from the sensor indicative of a flow rate of the mixture passing through the sensor via the first conduit.

16 Claims, 22 Drawing Sheets

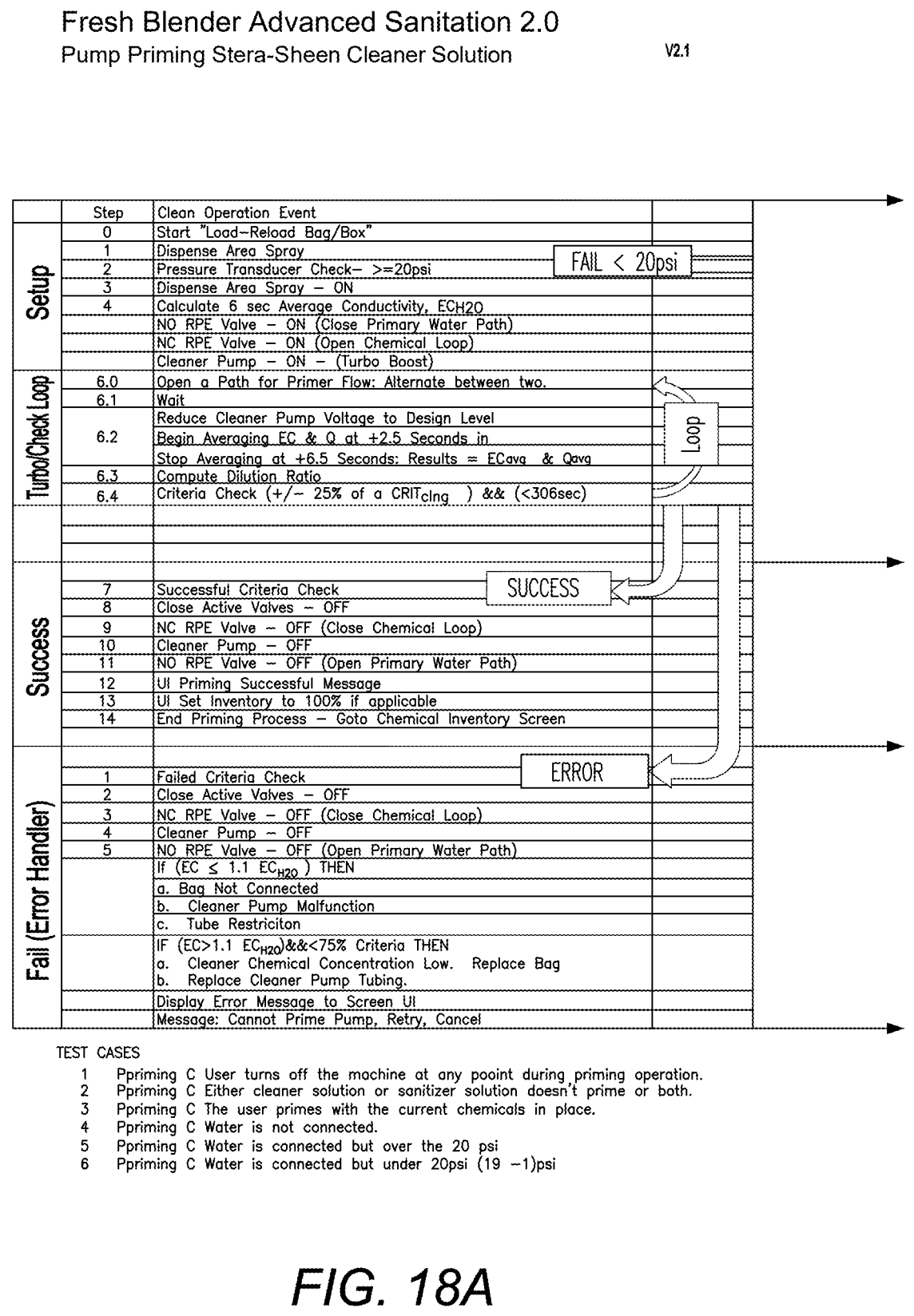

Fresh Blender Advanced Sanitation 2.0

Pump Priming Stera-Sheen Cleaner Solution V2.1

| | Step | Clean Operation Event | | |
|---|---|---|---|---|
| Setup | 0 | Start "Load–Reload Bag/Box" | | |
| | 1 | Dispense Area Spray | | |
| | 2 | Pressure Transducer Check– >=20psi | FAIL < 20psi | |
| | 3 | Dispense Area Spray – ON | | |
| | 4 | Calculate 6 sec Average Conductivity, $EC_{H2O}$ | | |
| | | NO RPE Valve – ON (Close Primary Water Path) | | |
| | | NC RPE Valve – ON (Open Chemical Loop) | | |
| | | Cleaner Pump – ON – (Turbo Boost) | | |
| Turbo/Check Loop | 6.0 | Open a Path for Primer Flow: Alternate between two. | | |
| | 6.1 | Wait | | |
| | 6.2 | Reduce Cleaner Pump Voltage to Design Level<br>Begin Averaging EC & Q at +2.5 Seconds in<br>Stop Averaging at +6.5 Seconds: Results = ECavg & Qavg | Loop | |
| | 6.3 | Compute Dilution Ratio | | |
| | 6.4 | Criteria Check (+/– 25% of a $CRIT_{clng}$ ) && (<306sec) | | |
| | | | | |
| | | | | |
| | | | | |
| Success | | | | |
| | 7 | Successful Criteria Check | SUCCESS | |
| | 8 | Close Active Valves – OFF | | |
| | 9 | NC RPE Valve – OFF (Close Chemical Loop) | | |
| | 10 | Cleaner Pump – OFF | | |
| | 11 | NO RPE Valve – OFF (Open Primary Water Path) | | |
| | 12 | UI Priming Successful Message | | |
| | 13 | UI Set Inventory to 100% if applicable | | |
| | 14 | End Priming Process – Goto Chemical Inventory Screen | | |
| | | | | |
| Fail (Error Handler) | | | | |
| | 1 | Failed Criteria Check | ERROR | |
| | 2 | Close Active Valves – OFF | | |
| | 3 | NC RPE Valve – OFF (Close Chemical Loop) | | |
| | 4 | Cleaner Pump – OFF | | |
| | 5 | NO RPE Valve – OFF (Open Primary Water Path) | | |
| | | If (EC ≤ 1.1 $EC_{H2O}$ ) THEN | | |
| | | a. Bag Not Connected | | |
| | | b. Cleaner Pump Malfunction | | |
| | | c. Tube Restriciton | | |
| | | IF (EC>1.1 $EC_{H2O}$)&&<75% Criteria THEN<br>a. Cleaner Chemical Concentration Low. Replace Bag<br>b. Replace Cleaner Pump Tubing. | | |
| | | Display Error Message to Screen UI | | |
| | | Message: Cannot Prime Pump, Retry, Cancel | | |

TEST CASES

1 Ppriming C User turns off the machine at any pooint during priming operation.
2 Ppriming C Either cleaner solution or sanitizer solution doesn't prime or both.
3 Ppriming C The user primes with the current chemicals in place.
4 Ppriming C Water is not connected.
5 Ppriming C Water is connected but over the 20 psi
6 Ppriming C Water is connected but under 20psi (19 –1)psi

*FIG. 18A*

Fresh Blender Advanced Sanitation 2.0

Weekly Cleaning Routine/Sequence 3.2.1

| | Step | Clean Operation Event | MODE |
|---|---|---|---|
| Pre Rinse | 1 | Start Weekly Clean | PR |
| | 2 | Move Shuttle Right | PR |
| | 3 | Dispense Are Spray – ON | PR |
| | 4 | Rinse product line 1 /w water | PR |
| | | Rinse product line 2 /w water | PR |
| | | Rinse product line 3 /w water | PR |
| | | Rinse product line 4 /w water | PR |
| | | Rinse product line 5 /w water | PR |
| | | Rinse product line 6 /w water | PR |
| | | Rinse product line 7 /w water | PR |
| | | Rinse product line 8 /w water | PR |
| | 5 | Dispense Area Spray – OFF | PR |
| | 6 | Move Shuttle Left | PR |
| | 7 | Blender Rinse (Shaft/Blade) (Hardcoded) | PR |
| Cleaner Mode | 1 | Boxer Pump – ON (Add Cleaner Solution to Water) | CM |
| | 2 | Dispense Area Spray | CM |
| | 3 | Clean product line 1 /w Cleaning Solution | CM |
| | | Clean product line 2 /w Cleaning Solution | CM |
| | | Clean product line 3 /w Cleaning Solution | CM |
| | | Clean product line 4 /w Cleaning Solution | CM |
| | | Clean product line 5 /w Cleaning Solution | CM |
| | | Clean product line 6 /w Cleaning Solution | CM |
| | | Clean product line 7 /w Cleaning Solution | CM |
| | | Clean product line 8 /w Cleaning Solution | CM |
| | 4 | Blender Cleaner Script (Shaft/Blade) | CM |
| | 5 | Boxer Pump – OFF | CM |
| | 6 | Soak Time | CM |
| | 7 | Dispense Area Spray | CM |
| | 8 | Rinse product line 1 /w water | CM |
| | | Rinse product line 2 /w water | CM |
| | | Rinse product line 3 /w water | CM |
| | | Rinse product line 4 /w water | CM |
| | | Rinse product line 5 /w water | CM |
| | | Rinse product line 6 /w water | CM |
| | | Rinse product line 7 /w water | CM |
| | | Rinse product line 8 /w water | CM |
| | 9 | Blender Rinse (Shaft/Blade) (Hardcoded) | CM |
| Sanitize Mode | 1 | Boxer Pump – ON (Add Sanitizer Solution to Water) | SM |
| | 2 | Dispense Area Spray | SM |
| | 3 | Sanitize product line 1 / w Sanitizer Solution | SM |
| | | Sanitize product line 2 / w Sanitizer Solution | SM |
| | | Sanitize product line 3 / w Sanitizer Solution | SM |
| | | Sanitize product line 4 / w Sanitizer Solution | SM |
| | | Sanitize product line 5 / w Sanitizer Solution | SM |
| | | Sanitize product line 6 / w Sanitizer Solution | SM |
| | | Sanitize product line 7 / w Sanitizer Solution | SM |
| | | Prod line 8 sol valve ON & Boxer Pump Boosts to 24 V at t=0 | SM |
| | | Begin measuring EC & Q at t = 3 sec | SM |
| | | Quit measuring EC & Q at t = 13 sec (result is avg of EC & Q) | SM |
| | | Boxer pump OFF | SM |
| | | Line 8 solenoid valve OFF | SM |
| | 4 | Calculate Dilution Ratio; Log computed values, criteria. | SM |
| | 5 | Boxer Pump ON (wait until Blender Spray Starts) | SM |
| | 6 | Blender Sanitizer Script. 1.8 times longer | SM |
| | 7 | Boxer Pump – OFF | SM |
| | 8 | Activate Inlet Water Valve | SM |
| | 9 | Soak Time | SM |
| Purge | 4 | Dispense Area Spry – ON | P |
| | 5 | Wait | P |
| | 10 | Dispense Area Spray – OFF | P |
| Rinse | 1 | Rinse product line 1 /w water | R |
| | | Rinse product line 2 /w water | R |
| | | Rinse product line 3 /w water | R |
| | | Rinse product line 4 /w water | R |
| | | Rinse product line 5 /w water | R |
| | | Rinse product line 6 /w water | R |
| | | Rinse product line 7 /w water | R |
| | | Rinse product line 8 /w water | R |
| | 2 | Blender Rinse (Shaft/Blade) (Hardcoded) | R |
| Normal | 1 | Move Shuttle Right | N |
| | 2 | Auto Prime | N |
| | 3 | Move Shuttle Left | N |
| | 4 | Final Rinse | N |
| | 5 | Drain Cleaner Routine | N |
| | 6 | Ready for Drink Production | N |
| | | | TIME |

FIG. 19A

AUTOMATED CLEANING SYSTEM FOR A BEVERAGE DISPENSER

BACKGROUND

1. Field of the Disclosure

The present disclosure is directed to beverage dispensers. More particularly, the present disclosure relates to a cleaning system for a beverage dispenser.

2. Description of the Related Art

Beverage dispensers are available that mix and/or blend ice and flavored ingredients together to form frozen or chilled beverages, for example, smoothies, frappes, Frappuccino® drinks, daquiris, carbonated soft drinks and other beverages. These devices require periodic cleaning to ensure flavor consistency and to maintain safety. Such cleaning undesirably requires operators of the beverage devices to remember to perform the cleaning as well as connect the beverage devices to the cleaning liquid and/or sanitizing liquid sources each time the beverage devices are cleaned.

Accordingly, it has been determined by the present disclosure that there is a continuing need for a system that overcomes, alleviates, and/or mitigates one or more of the aforementioned and other deleterious effects of prior devices.

SUMMARY

A cleaning system is provided for a beverage dispenser. This disclosure illustrates a cleaning (e.g., cleaning, sanitizing, and/or rinsing) system for a beverage dispensing device.

The beverage dispensing device blends and/or mixes beverage ingredients in a cup, thereby producing a beverage, e.g., a smoothie, which can then be served to a consumer allowing the consumer to drink the beverage from the same cup that the beverage ingredients were blended and/or mixed in. The beverage dispensing device, hereinafter the beverage dispenser, includes plumbing to direct flows of liquid ingredients to the cup. It is desirable to clean flow paths of the plumbing to maintain cleanliness and safety of the beverage dispenser along with providing a means of cleaning other mechanical parts and surfaces of the device. Advantageously, the beverage dispenser has a cleaning system to clean the flow paths of the plumbing and other mechanical parts and surfaces with cleaning and/or sanitizing liquids. The cleaning system can be configured to automatically clean the aforementioned areas periodically, once supplied with the cleaning and/or sanitizing liquids.

A cleaning system for a beverage dispenser, the system comprising: a water source; a cleaner solution source and/or a sanitizer solution source; at least one cleanable ingredient circuit of the beverage dispenser which is in fluid connection with the water source, and the cleaner solution source and/or sanitizer solution source; a first conduit for connecting the water source to the at least one cleanable ingredient circuit via a sensor; at least one second conduit for connecting the cleaner solution source and/or sanitizer solution source to the first conduit via at least one pump prior to the sensor, thereby forming a mixture of the water, a cleaner solution, and/or a sanitizing solution; and a controller for: (a) receiving a first signal from the sensor representative of electrical conductivity of the mixture, whereby the controller calculates a dilution ratio of the mixture from the electrical conductivity; and/or (b) receiving a second signal from the sensor indicative of a flow rate of the mixture passing through the sensor via the first conduit.

The cleaning system, wherein the controller controls the flow rate of the at least one pump, in response to the first and/or second signals, thereby controlling the dilution ratio of the mixture that is passed to the at least one cleanable ingredient circuit.

The cleaning system, wherein the controller uses the second signal to calculate total flow of mixture.

The cleaning system, further comprising: a blender shaft having a blender blade; wherein after rinsing, cleaning or sanitizing of the at least one cleanable ingredient circuit, the blender shaft and the blade are lowered to a position in the blending system wherein the blender and the blade are rinsed, cleaned, or sanitized after the respective rinsing, cleaning and/or sanitizing of the at least one cleanable ingredient circuit.

The cleaning system, wherein the calculated dilution ratio via the controller, controls the speed of the pump, thereby adjusting the flow rate of either the cleaner solution and/or sanitizer solution.

The cleaning system, wherein the pump is controlled to maintain the mixture at a substantially constant ratio of water to either the cleaner solution and/or sanitizer solution.

The cleaning system further comprising a cleaning loop for maintaining a quantity of the mixture to the at least one cleanable ingredient circuit.

The cleaning system, further comprising a pressure regulator for regulating pressure of the water from the water source.

A method of injecting at least one of a cleaning solution or a sanitizing solution into a cleanable portion of a beverage dispenser, wherein determining the dilution ratio of the cleaning solution or the sanitizing solution to water comprises the steps of: (a) injecting the cleaning solution or the sanitizing solution into an incoming stream of the water to form a mixture, the mixture flowing through the cleanable portion of the beverage dispenser; (b) measuring the electrical conductivity (EC) of the mixture to provide an EC value; (c) converting the EC value to a measured dilution ratio (DR); and (d) using the resulting DR to determine a quantity of the cleaning solution or the sanitizing solution used during an automatic, periodic cleaning of the portion of the beverage dispenser.

The method, wherein determining the dilution ratio of the cleaning solution to the water further comprises the steps of: (a) obtaining an EC reading of a base-water used to produce the mixture; (b) converting the EC to a DR equivalent of the base-water; and (c) using the DR equivalent to correct the EC of the mixture to obtain a DR of the mixture.

The method, further comprising storing in a controller of the beverage dispenser the EC reading of the base-water.

The method, further comprising retrieving from a database an EC of the base-water at a particular location.

The method, wherein the database further comprises a series of EC values of base-water at a number of geographic locations for possible use of the beverage dispenser; and the EC value of the base water corresponding to a location of use of the beverage dispenser being selected as an operative EC value of the base water.

The method, wherein when the beverage dispenser is installed at a location not having an EC value of the base-water stored in the database, the EC value of the base water is measured by the beverage dispenser to determine a new EC value; and the new EC value is added to the database.

The method, wherein a quantity of the water in the mixture is measured by steps comprising: determining flow rate of the water used in the mixture; averaging the flow rate over an interval of time to determine an average flow rate; and multiplying the average flow rate by length of the interval of time.

The method, wherein a quantity of the water in the mixture is measured by steps comprising: determining flow rate of the water used in the mixture as a function of time during a time interval; and integrating the flow rate over the time interval.

The method, wherein a quantity of a cleaning solution or a sanitizing solution used in the mixture is determined by operating a pump that injects the cleaning solution or the sanitizing solution into the water.

The method, wherein speed of operation of the pump is controlled to determine a quantity of the cleaning solution or the sanitizing solution in the mixture.

The method, further comprising: (a) operating the pump at a significantly higher applied voltage than nominal to determine a high voltage dilution ratio; (b) measuring a total flow rate through the cleanable circuit; (c) calculating a high-voltage chemical flow rate by utilizing the total flow rate and the high voltage dilution ratio in a predefined equation; and (d) performing a dilution ratio normalization to convert the high-voltage chemical flow rate to a flow rate indicative of the pump operating at the nominal voltage, whereby unknown effects of the water quality on dilution ratio determination is minimized.

A computer readable medium comprising computer instructions thereon for causing a microprocessor associated with the beverage dispenser to perform the steps above.

A method for cleaning and sanitizing portions of a beverage dispenser comprising: sequentially rinsing with water of a series of cleanable ingredient circuits; spraying a blender assembly of the beverage dispenser with the water for a predetermined period of time sequentially cleaning or sanitizing with a mixture of water, and cleaning solution and/or a sanitizing solution the series of cleanable ingredient circuits; spraying the blender assembly with the mixture; allowing the blender assembly to soak with the mixture for a predetermined period of time; determining an electrical conductivity value of the mixture; and processing the electrical conductivity value to determine an adjustment to its value to account for a variation of the electrical conductivity, when the mixture is flowing.

The method, wherein the spraying of the blender comprises: moving the blender assembly to position a shaft of the blender assembly to be sprayed; and further moving the blender assembly to positioning a blade of the blender assembly to be sprayed.

The method further comprising preparing to deliver beverages after cleaning and/or sanitizing by priming the cleanable ingredient circuits with respective ingredients.

The method further comprising spraying a beverage stage area of the beverage dispenser with water.

The above and other objects, features, and advantages of the present disclosure will be apparent and understood by those skilled in the art from the following detailed description, drawings, and accompanying claims. As shown throughout the drawings, like reference numerals designate like or corresponding parts.

BRIEF DESCRIPTION OF THE DRAWINGS

FIGS. 18A and 18B when assembled with FIG. 18A to the left and FIG. 18B to the right, constitute FIG. 18 and is a chart of a beverage dispenser with a cleaning system and a pump utilizing a priming Stera-Sheen cleaner solution that can be used with the cleaning assembly of FIG. 1 having some features omitted for clarity and shown in an alternative embodiment.

FIGS. 19A and 19B when assembled with FIG. 19A to the left and FIG. 19B to the right, constitute FIG. 19 and is a chart of a beverage dispenser with a cleaning system and a pump performing a weekly cleaning routine/sequence that can be used with the cleaning assembly of FIG. 1 having some features omitted for clarity and shown in an alternative embodiment.

DETAILED DESCRIPTION OF THE DISCLOSURE

Figure 1:
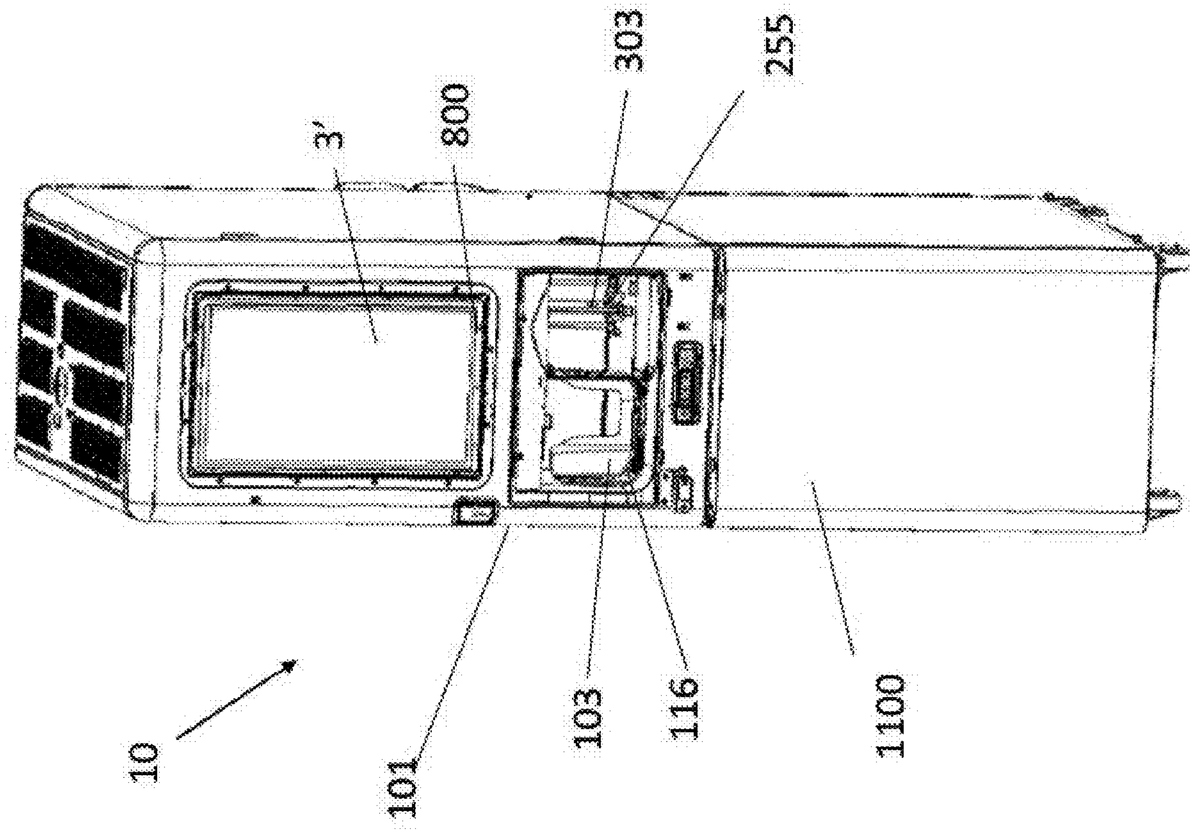
FIG. 1 is a top, front perspective view of a beverage dispenser that can be used with a cleaning assembly according to the present disclosure.

A beverage dispenser generally represented by reference numeral 10 of the present disclosure is shown in FIG. 1. Beverage dispenser 10 blends and/or mixes beverage ingredients in a cup, thereby producing a beverage, e.g., a smoothie, which can then be served to a consumer allowing the consumer to drink the beverage from the same cup that the beverage ingredients were blended and/or mixed in. Beverage dispenser 10 includes plumbing to direct flows of liquid ingredients to the cup. It also includes numerous mechanical parts and surfaces that assist in the production of the drink (e.g., blender assembly, dispense nozzle, drink shuttle). It is desirable to clean flow paths of the plumbing and other mechanical parts and surfaces to maintain cleanliness and safety of beverage dispenser 10. Advantageously, beverage dispenser 10 has a cleaning system that cleans the flow paths of the plumbing and mechanical parts and surfaces with cleaning and/or sanitizing liquids. The cleaning system can be configured to automatically clean the aforementioned areas periodically, once supplied with the cleaning and/or sanitizing liquids.

Beverage dispenser 10 has a system that can be integrated with separate external containers, and includes a flavor/ingredient dispensing module 1100, an ice making, and portion control module (not shown) housed in a housing 101, a blender/mixer/cleaner module 303 and a user interface 3'. Flavor/ingredient dispensing module 1100 includes one or more containers, e.g., bag-in-box containers, that each hold ingredients, for example, flavored liquid ingredients, which are delivered to a nozzle assembly 1102 (FIG. 2) by pump(s) to dispense the ingredients into the cup. Ice making and portion control module (not shown) makes ice and delivers the ice to the cup through nozzle assembly 1102. Blender/mixer/cleaner module 303 includes a blender blade 255 to mix and/or blend the ingredients and/or ice in the cup. Blender/mixer/cleaner module 303 also includes a nozzle 59 (FIG. 4) to rinse blender blade 255 after the blending and/or mixing.

Beverage dispenser 10 can include an onboard ice maker, ice storage and portion control module (not shown), a flavor/ingredient dispensing module 1100, a blender module 303, blender/mixer/cleaner module 15 and a user interface 3 similar to U.S. Pat. No. 8,459,176, filed Dec. 8, 2009, that is hereby incorporated by reference in its entirety. Alternatively, beverage dispenser 10 can include an onboard ice maker (not shown), ice storage and portion control module (not shown), a flavor/ingredient dispensing module 1100, a blender/mixer/cleaning module 303, control panel 500 similar to U.S. Pat. No. 8,863,992, filed Oct. 5, 2012 that is hereby incorporated by reference in its entirety, or other ice makers, ice storage and portion control modules, flavor/ingredient dispensing modules, blender modules, blender/mixer/cleaner modules and/or user interfaces of similar beverage dispensers or devices know in the art.

Figure 2:
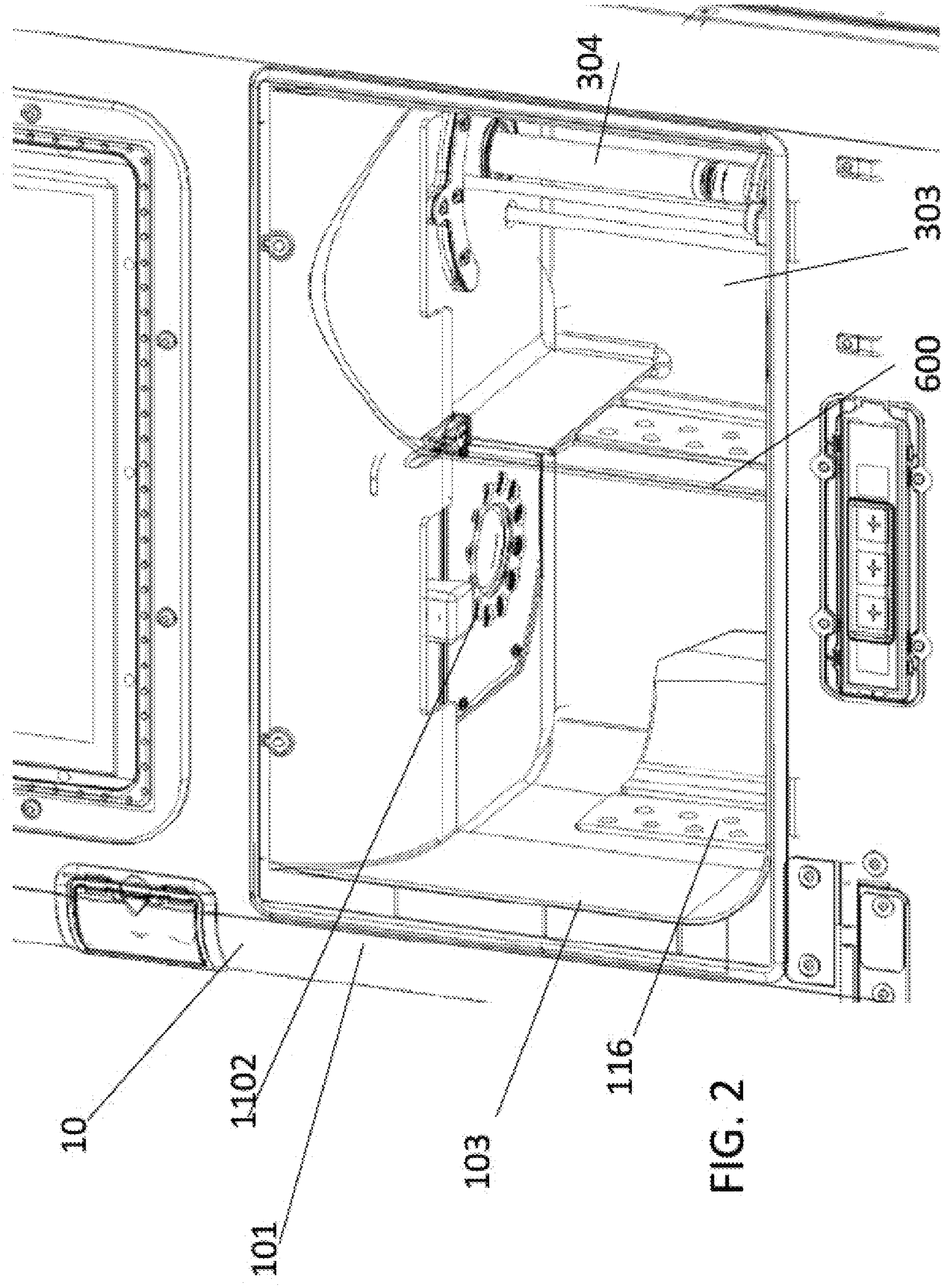
FIG. 2 is an enlarged bottom, front perspective view of the beverage dispenser that can be used with the cleaning assembly of FIG. 1.
Figure 3:
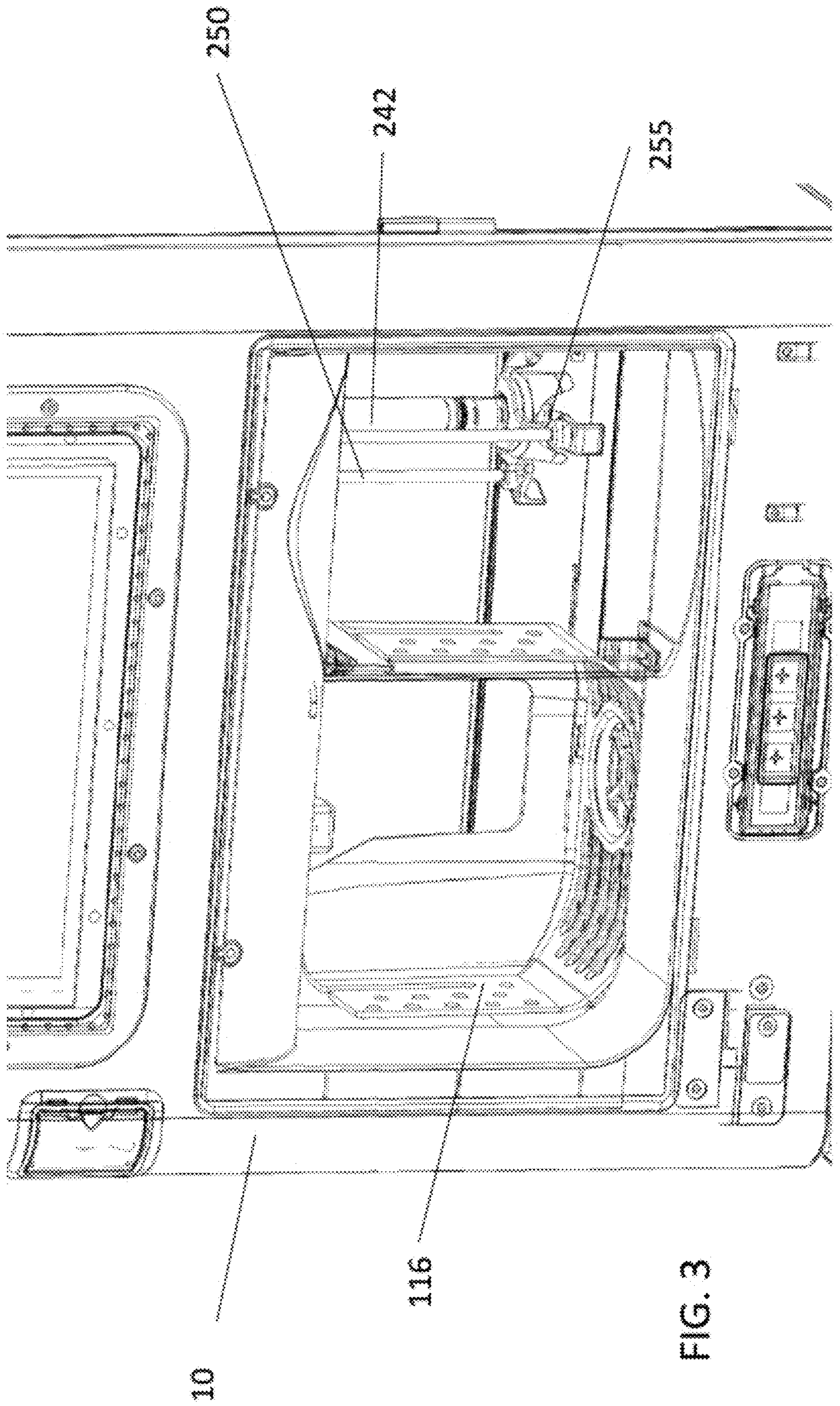
FIG. 3 is an enlarged top, front perspective view of the beverage dispenser that can be used with the cleaning assembly of FIG. 1.
Figure 4:
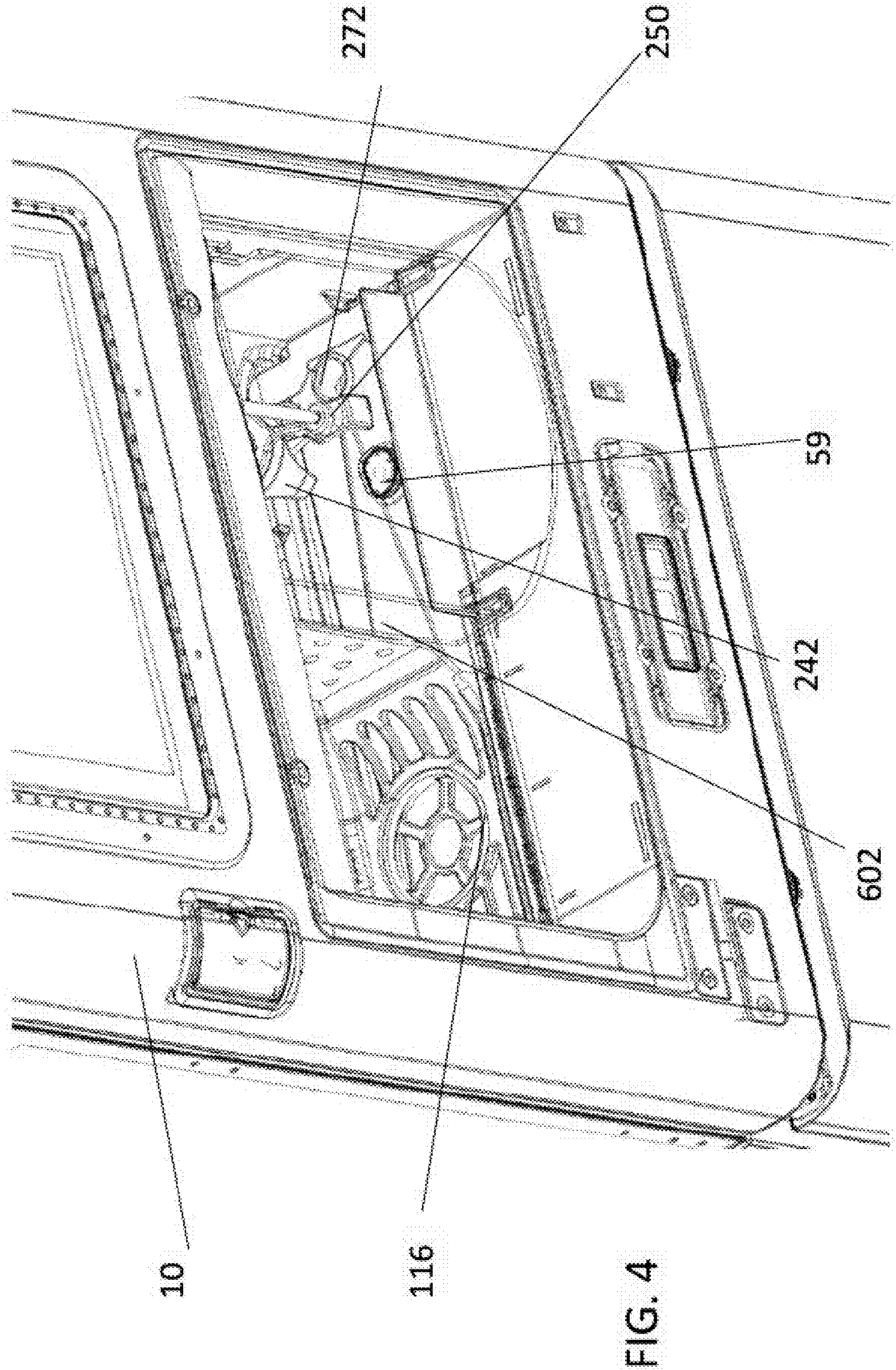
FIG. 4 is an enlarged top, side perspective view of the beverage dispenser that can be used with the cleaning assembly of FIG. 1.

Referring to FIG. 2, in operation, an empty cup is placed through an opening 103 in housing 101 and placed on a surface of a shuttle 116. The cup receives ingredients and ice through nozzle assembly 1102 while positioned on shuttle 116. Blender/mixer/cleaner module 303 has a front wall 600 covering a portion of front opening 103 forming a first opening 602 on a side of front wall 600 as shown in FIG. 4. After the cup receives the ingredients and ice, the cup is moved by shuttle 116 from below nozzle assembly 1102, as shown in FIG. 2, through first opening 602, to blender/mixer/cleaner module 303 so that shuttle 116 positions the cup under blender blade 255 as shown in FIG. 3. Blender/mixer/cleaner module 303 has blender blade 255 that is connected to a spindle assembly 242. Spindle assembly 242 includes a shaft to connect blender blade 255 to a mixer motor (not shown) that spins blender blade 255. Spindle assembly 242 passes through a support assembly 250. Support assembly 250 contacts the cup during blending and/or mixing to maintain the cup's position and prevent rotation of the cup. During operation, after cup is moved by shuttle 116 from beneath nozzle assembly 1120 to blender/mixer/cleaner module 303, support assembly 250 and spindle assembly 242 are moved towards the cup from an initial position. Once support assembly 250 contacts the cup, spindle assembly 242 can continue to move blender blade 255 in the cup while support assembly 250 is maintained in position on a rim of the cup to hold the cup in place. The mixer motor rotates blender blade 255 in the cup. After blending/mixing is complete, spindle assembly 242 and support assembly 250 are moved away from the cup back to the initial position and the cup is moved by shuttle 116 back to below nozzle assembly 1102 where a user can remove the cup having the completed beverage for consumption.

Referring to FIG. 4, after shuttle 116 is positioned back below nozzle assembly 1102, spindle assembly 242 and support assembly 250 are lowered toward a bottom portion of blender/mixer/cleaner module 303 where water is sprayed at spindle assembly 242 and support assembly 250 from a nozzle 59 for cleaning. The water that rinses spindle assembly 242 and support assembly 250 then drains out of drain 272. After rinsing, spindle assembly 242 and support assembly 250 are moved to the initial position. Another beverage can then be prepared by beverage dispenser 10.

Figure 5:
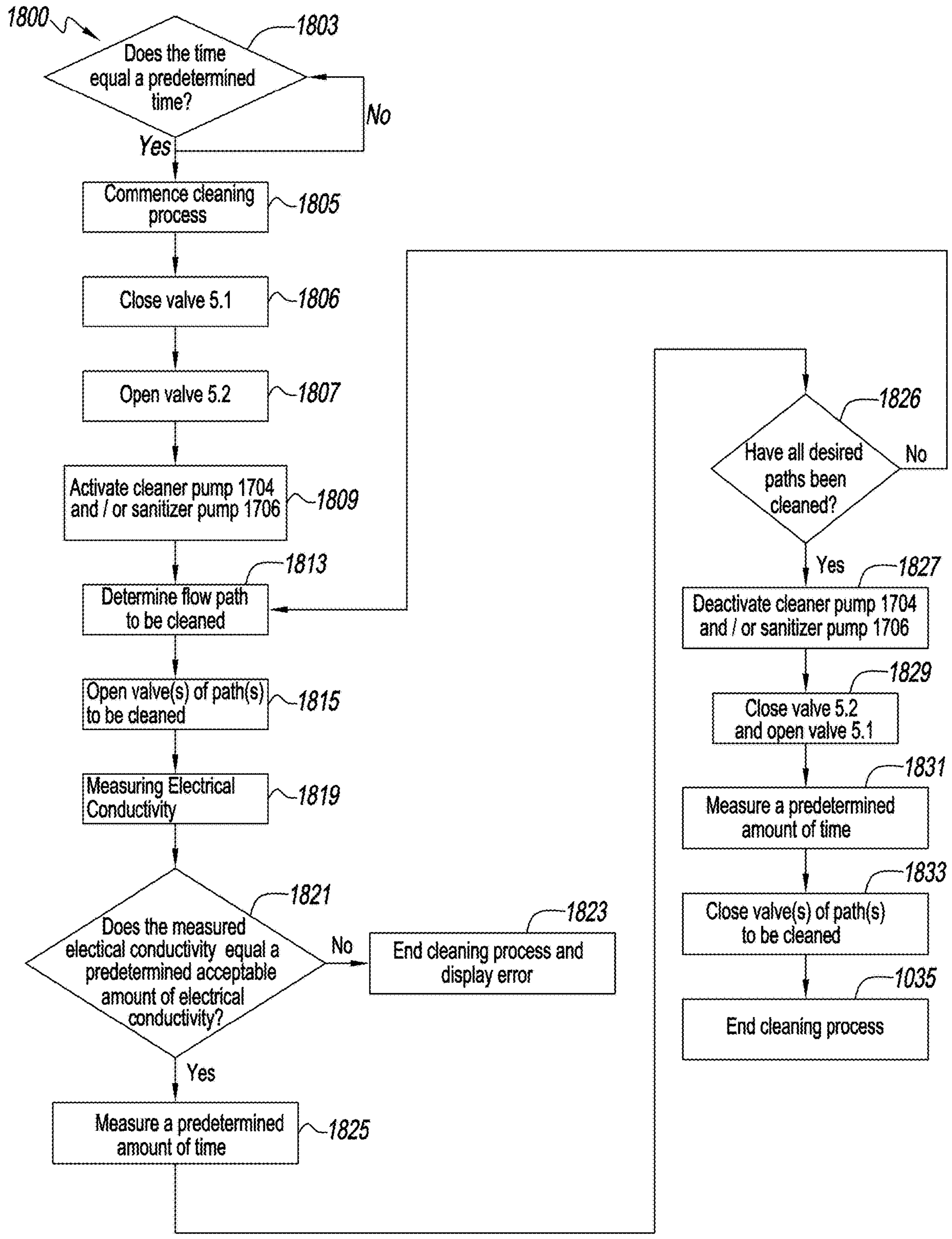
FIG. 5 is a flow chart of a cleaning and/or sanitizing process of the beverage dispenser that can be used with the cleaning assembly of FIG. 1 and shown in FIG. 6, and FIGS. 11-17.
Figure 12:
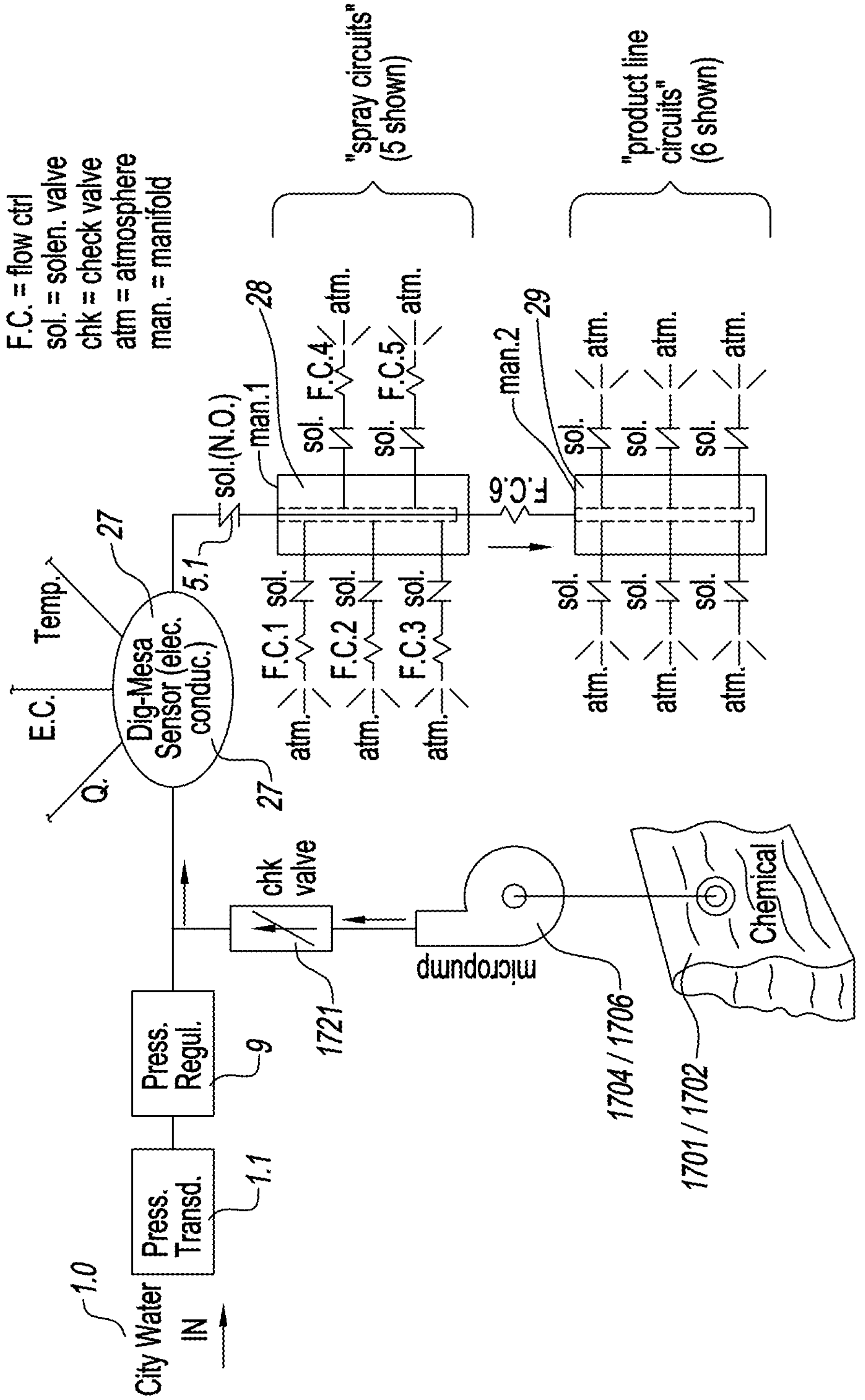
FIG. 12 is a diagram of a sanitation system of the beverage dispenser that can be used with the cleaning assembly of FIG. 1 having some features omitted for clarity and shown in an alternative embodiment.
Figure 13:
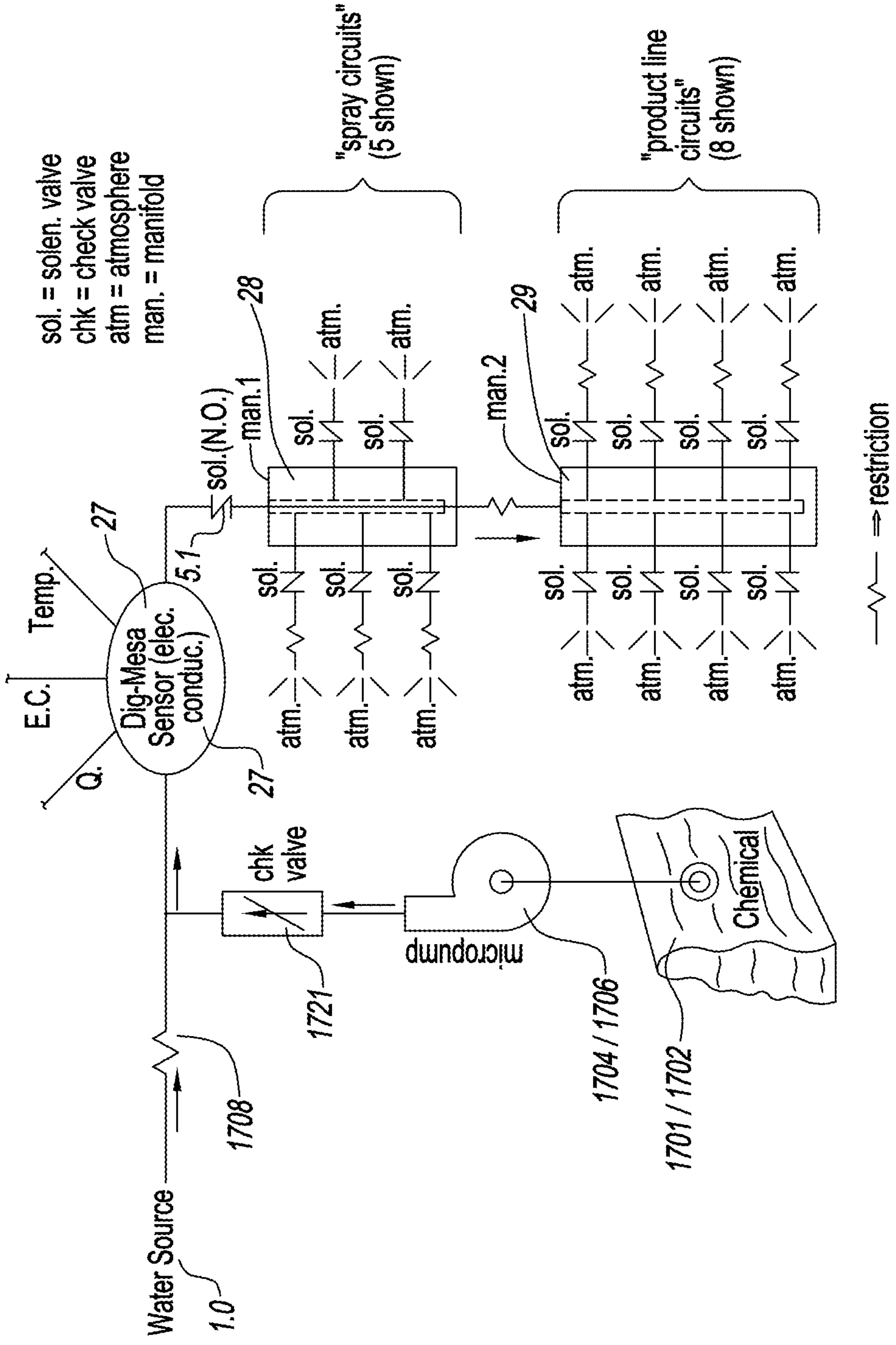
FIG. 13 is a diagram of a sanitation system of the beverage dispenser that can be used with the cleaning assembly of FIG. 1 having some features omitted for clarity and shown in an alternative embodiment.
Figure 14:
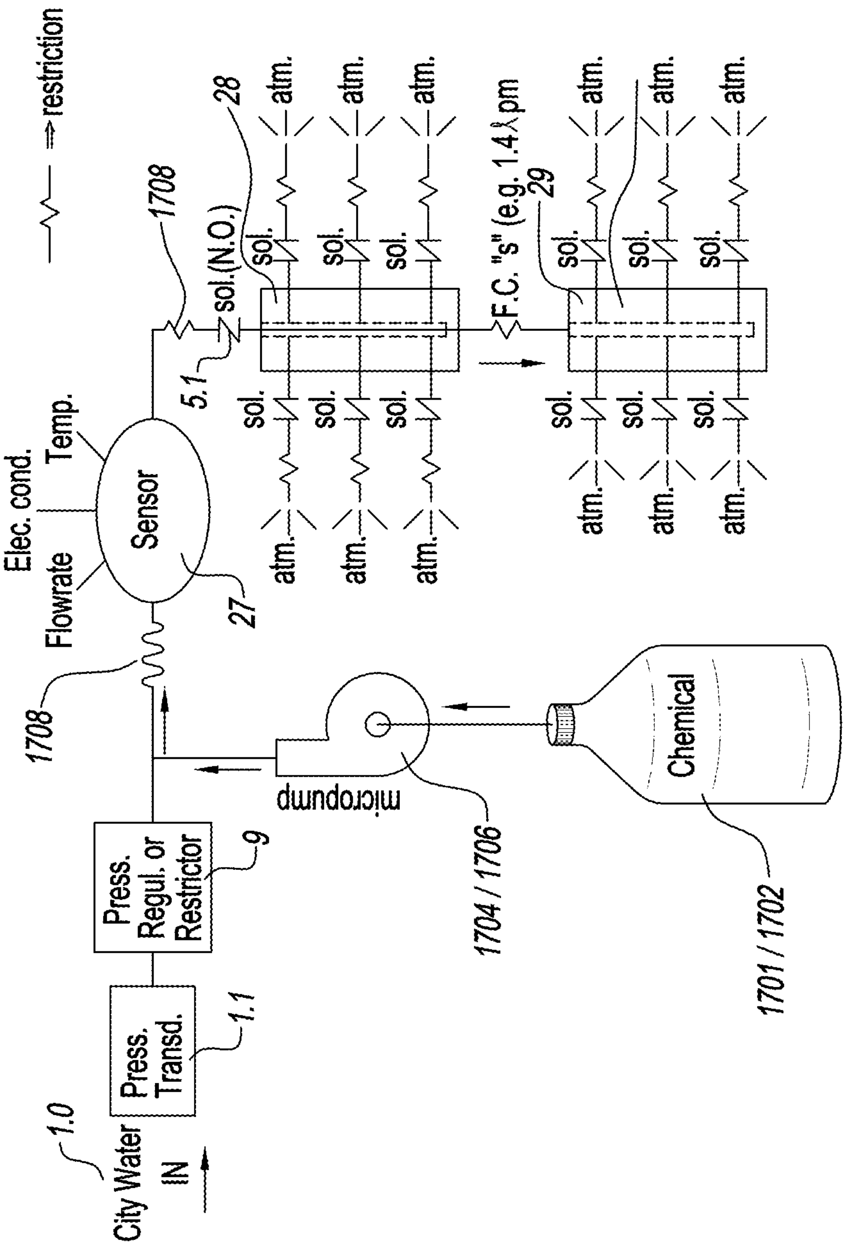
FIG. 14 is a diagram of a sanitation system of the beverage dispenser that can be used with the cleaning assembly of FIG. 1 having some features omitted for clarity and shown in an alternative embodiment.
Figure 15:
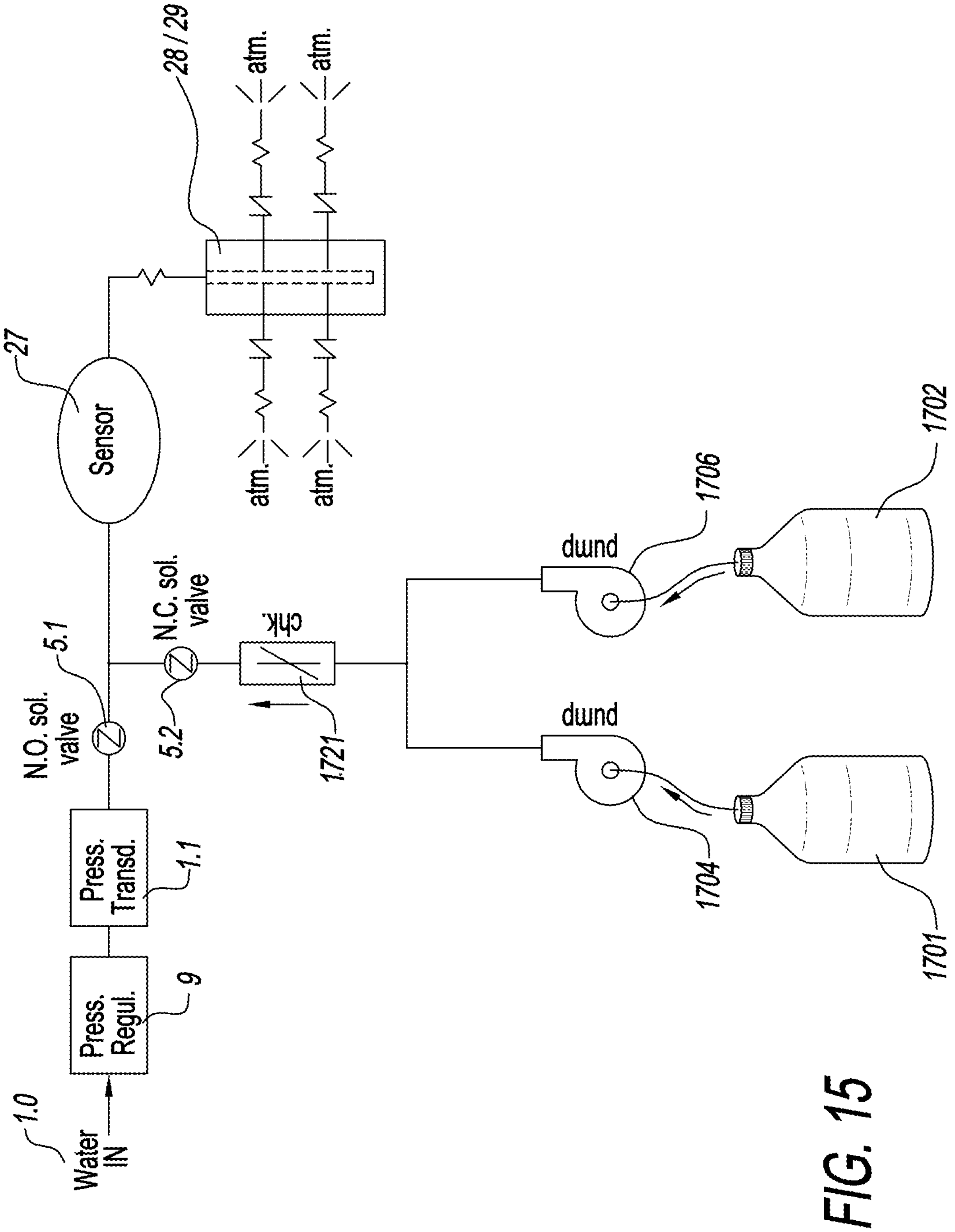
FIG. 15 is a diagram of a sanitation system of the beverage dispenser that can be used with the cleaning assembly of FIG. 1 having some features omitted for clarity and shown in an alternative embodiment.
Figure 16:
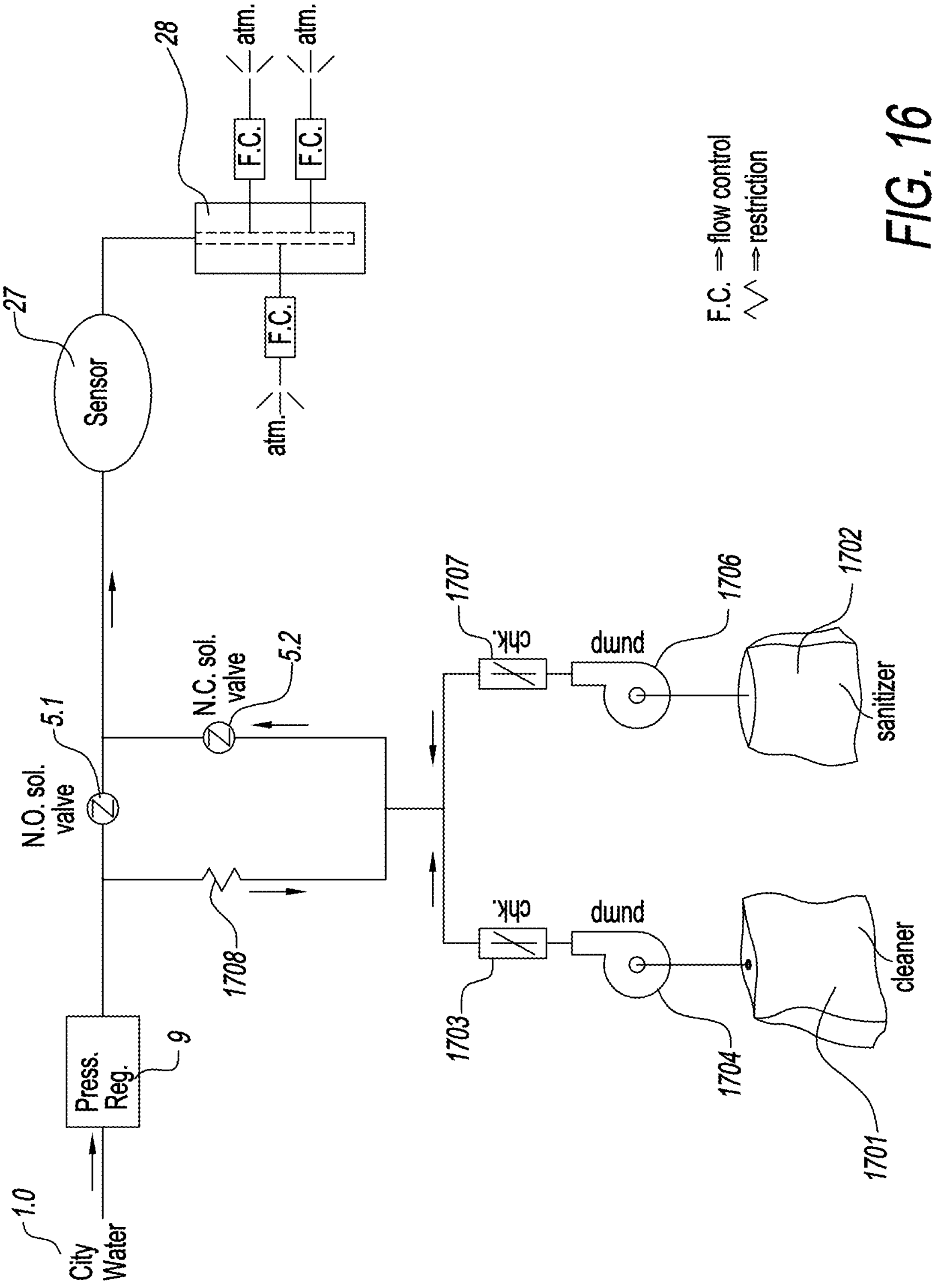
FIG. 16 is a diagram of a sanitation system of the beverage dispenser that can be used with the cleaning assembly of FIG. 1 having some features omitted for clarity and shown in an alternative embodiment.

Referring to FIG. 5, controller 800 is programmed to periodically clean and/or sanitize the flow paths of the plumbing of beverage dispenser 10 for the plumbing schematic of FIGS. 7B and 12 by commencing a cleaning and/or sanitizing process 1800. When controller 800 determines it is a predetermined time in step 1803, then controller 800 commences the cleaning and/or sanitizing process in step 1805. When controller 800 determines it is not a predetermined time in step 1803, then controller 800 repeats step 1803. After the cleaning and/or sanitizing process commences in step 1805, then valve 5.1 is closed in step 1806, then valve 5.2 is opened in step 1807 and cleaner pump 1704 and/or sanitizer pump 1706 are activated in step 1809 so that cleaner flows from cleaner container 1701 through cleaner pump 1704, check valve 23 and/or check valve 1703 and first opening 133 and second opening 133*a* of wye fitting 22 and/or sanitizer flows from sanitizer container 1702 through sanitizer pump 1706, check valve 23 (and/or check valve 1707) and first opening 133 and third opening 133*b* of wye fitting 22 to mix with water flowing from water source 1.0 through coupling 1, pressure transducer 1.1 and pressure changing device 1708 to form diluted cleaner and/or diluted sanitizer. Controller 800, then, determines a path or paths of the plumbing of beverage dispenser 10 that are to be cleaned in step 1813 that is the same as step 1013 of process 1001 and opens valves associated with those path or paths in step 1815 that is the same as step 1015 of process 1001. Combination sensor 27 can measure the electrical conductivity in step 1819 that is communicated to controller 800. Controller 800 determines whether a predetermined acceptable amount of electrical conductivity is present that is related to whether a desired amount of cleaner and/or sanitizer is mixed with the water flow in step 1821. For example, combination sensor 27 measures a conductivity of the water without cleaner and/or sanitizer to determine a value that can then be compared with a measurement of the conductivity of the water mixed with the cleaner and/or sanitizer to determine if the measured conductivity of the water mixed with the cleaner and/or sanitizer is in a predetermined range of conductivity that is desirable. If there is not the desired amount of cleaner and/or sanitizer mixed with the water flow, then the cleaning and/or sanitizing process 1800 proceeds to step 1823 where controller 800 ends the cleaning process, for example, by deactivating cleaner pump 1704 and/or sanitizer pump 1706, closing valve 5.2 and closing the paths being cleaned, and communicates an error to a user, for example, through user interface 3'. Alternatively, instead of ending the cleaning process in step 1823, controller 800 can instead immediately change the voltage to cleaner pump 1704 and/or sanitizer pump 1706 to try and achieve the desired amount of cleaner and/or sanitizer mixed with the water flow, and, then process can proceed to step 1825. Still another alternative is that this activity is only done occasionally, or only after a new chemical container is installed. If it is done just once (to account for different “concentration” or makeup of chemical, for example), then it is assumed that any subsequent drop-off is due to the container going empty. If/when this process is done, it obviously works both ways, the voltage will be either increased or decreased to try and hit a target dilution ratio, namely, the desired amount of cleaner and/or sanitizer mixed with the water flow. If there is the desired amount of cleaner and/or sanitizer mixed with the water flow, then the cleaning and/or sanitizing process 1800 proceeds to step 1825 where the diluted cleaner and/or the diluted sanitizer is allowed to flow for a predetermined amount of time through the flow paths determined in step 1813. After controller 800 determines that the predetermined amount of time elapsed, then the cleaning and/or sanitizing process 1800 proceeds to determine if all the desired flow paths have been cleaned in step 1826, if the answer is yes, then cleaner pump 1704 and/or sanitizer pump 1706 are deactivated in step 1827. However, if the answer is no, the cleaning and/or sanitizing process 1800 proceeds to repeat again from step 1813, to ensure all flow paths have been cleaned and/or sanitized before proceeding on to the deactivation of cleaner pump 1704 and/or sanitizer pump 1706. Thereafter, valve 5.2 is closed and valve 5.1 is opened in step 1829. Controller 800 can allow the water flow to flow through one or more of the selected valves of openings 28*c*-28*h* and openings 29*b*-29*i* for a predetermined amount of time in step 1831 prior to closing the paths to be cleaned in step 1833. Controller 800 then ends the cleaning process in step 1835. There can be several “loops” in the cleaning cycles so that cleaning and/or sanitizing process 1800 is repeated for different path or paths of the plumbing of beverage dispenser 10 that are to be cleaned in step 1813 and opens different valves associated with those path or paths in step 1815 by controller 800 for the different loops. For example, one or more of plumbing paths that dispense the liquid ingredients where controller 800 opens the valve of one or more of openings 29*b*-*i* can be cleaned first and then everything else is cleaned afterwards to try and ensure that as much product is removed from the stage area and drain area by using the water and cleaner dispensed from the other outlets.

Manifold Valve(s) Open (“MVO”), is defined as one or more “outlet” solenoid valves of 28 or 29 open. The following descriptions assume an MVO state.

An example of steps for a process for daily cleaning of beverage dispenser 10 as controlled by controller 800 is as follows:

Shuttle 116 moves to a position under blender blade 255 in a blend (right) position.

Cleaner solenoid valve 17*a* that is normally closed, water solenoid valve 5.2 that is normally closed, and valve 5.1 that is normally open are turned ON to open cleaner solenoid valve 17*a* and solenoid valve 5.2 and close valve 5.1.

The solenoid valve of opening 28*g* for nozzles 54 and 56 of dispense area is turned on for six seconds to spray the dispense area.

Blender shaft 304 of spindle assembly 242 descends to near bottom of stroke as shown in FIG. 1

The blender blade spray solenoid valve of opening 28*d* turns ON for four (4) seconds to spray blender blade 255 with nozzle 59.

The blender shaft rinse solenoid valve of opening 28*f* turns ON for four (4) seconds to spray blender shaft 304 of spindle assembly 242 with nozzles 57.

The blender blade spray solenoid valve of opening 28*d* turns ON for four (4) seconds to spray blender blade 255 with nozzle 59.

The blender shaft rinse solenoid valve of opening 28*f* turns ON for four (4) seconds to spray blender shaft 304 of spindle assembly 242 with nozzles 57.

Blender shaft 304 of spindle assembly 242 then ascends to its top position.

Cleaner solenoid valve 17*a* that is normally closed, water solenoid valve 5.2 that is normally closed, and valve 5.1 that is normally open are turned off to close cleaner solenoid valve 17*a* and solenoid valve 5.2 and open valve 5.1.

The solenoid valve of opening 28*g* for nozzles 54 and 56 of dispense area is turned on for ten seconds to spray the dispense area.

Shuttle 116 moves to a dispense (left) position as shown in FIG. 1.

The blender shaft rinse solenoid valve of opening 28*f* turns ON to spray blender shaft 304 of spindle assembly 242 with nozzles 57.

Blender shaft 304 of spindle assembly 242 descends to near bottom of stroke as shown in FIG. 1.

The blender shaft rinse solenoid valve of opening 28*f* turns OFF after five seconds.

The blender blade spray solenoid valve of opening 28*d* turns ON for ten seconds.

Blender shaft 304 of spindle assembly 242 ascends to its top position.

Shuttle 116 moves to a position under blender blade 255 in a blend (right) position.

Sanitizer solenoid valve 17*b* that is normally closed, water solenoid valve 5.2 that is normally closed, and valve 5.1 that is normally open are turned ON to open sanitizer solenoid valve 17*b* and solenoid valve 5.2 and close valve 5.1.

The solenoid valve of opening 28*g* for nozzles 54 and 56 of dispense area is turned on for six seconds to spray the dispense area.

Blender shaft 304 of spindle assembly 242 descends to near bottom of stroke as shown in FIG. 1.

The blender blade spray solenoid valve of opening 28*d* turns ON for five seconds to spray the blender blade 255 with nozzle 59.

The blender shaft rinse solenoid valve of opening 28*f* turns ON for ten seconds to spray blender shaft 304 of spindle assembly 242 with nozzles 57.

The blender blade spray solenoid valve of opening 28*d* turns ON for four seconds to spray the blender blade 255 with nozzle 59.

Blender shaft 304 of spindle assembly 242 begins moving upwards at the same time the blender shaft rinse solenoid valve of opening 28*f* turns ON to spray blender shaft 304 of spindle assembly 242 with nozzles.

Blender shaft 304 of spindle assembly 242 stops halfway up for four seconds, in direct path of ongoing shaft spray from blender shaft rinse solenoid valve of opening 28*f* that is turned ON to spray blender shaft 304 of spindle assembly 242 with nozzles 57.

Blender shaft 304 of spindle assembly 242 reaches the top position, at which point blender shaft rinse solenoid valve of opening 28*f* turns off.

The solenoid valve of opening 28*g* for nozzles 54 and 56 of dispense area turns ON for nine seconds to spray the dispense area.

Shuttle 116 moves to the dispense (left) position as shown in FIG. 1.

The blender blade spray solenoid valve of opening 28*d* and the blender shaft rinse solenoid valve of opening 28*f* turn ON simultaneously for twelve seconds.

The solenoid valve of opening 28*g* for nozzles 54 and 56 of dispense area is turned on for twelve seconds to spray the dispense area.

The blender blade spray solenoid valve of opening 28*d* and the blender shaft rinse solenoid valve of opening 28*f* turn ON simultaneously for twelve seconds.

The solenoid valve of opening 28*g* for nozzles 54 and 56 of dispense area is turned on for twelve seconds to spray the dispense area.

It is noted that the last four steps are part of an extra cautionary "Final Rinse", to ensure the stage area is totally free of beverage product. It also occurs at the end of Weekly Cleaning, where it is probably more valuable (since all the product lines are flushed out during weekly cleaning).

An example of steps for a process for weekly cleaning of beverage dispenser 10 as controlled by controller 800 is as follows:

Shuttle 116 moves to a position under blender blade 255 in a blend (right) position.

The solenoid valve of opening 28*g* for nozzles 54 and 56 of dispense area that is normally closed is turned ON to open the solenoid valve of opening 28*g*.

The solenoid valve of opening 29*b* for Product Line 1 turns ON for twenty seconds to rinse Product Line 1, then the solenoid valve of opening 29*b* for Product Line 1 turns OFF.

The solenoid valve of opening 29*c* for Product Line 2 turns ON for twenty seconds to rinse Product Line 2, then the solenoid valve of opening 29*c* for Product Line 2 turns OFF.

The solenoid valve of opening 29*d* for Product Line 3 turns ON for twenty seconds to rinse Product Line 3, then the solenoid valve of opening 29*d* for Product Line 3 turns OFF.

The solenoid valve of opening 29*e* for Product Line 4 turns ON for twenty seconds to rinse Product Line 4, then the solenoid valve of opening 29*e* for Product Line 4 turns OFF.

The solenoid valve of opening 29*f* for Product Line 5 turns ON for twenty seconds to rinse Product Line 5, then the solenoid valve of opening 29*f* for Product Line 5 turns OFF.

The solenoid valve of opening 29*g* for Product Line 6 turns ON for twenty seconds to rinse Product Line 6, then the solenoid valve of opening 29*g* for Product Line 6 turns OFF.

The solenoid valve of opening 29*h* for Product Line 7 turns ON for twenty seconds to rinse Product Line 7, then the solenoid valve of opening 29*h* for Product Line 7 turns OFF.

The solenoid valve of opening 29*i* for Product Line 8 turns ON for twenty seconds to rinse Product Line 8, then the solenoid valve of opening 29*i* for Product Line 8 turns OFF.

After the Product Line 8 is flushed, the solenoid valve of opening 28*g* for nozzles 54 and 56 of dispense area that is normally closed is turned OFF.

Shuttle 116 moves to a dispense (left) position as shown in FIG. 1.

Blender shaft 304 of spindle assembly 242 descends to near bottom of stroke as shown in FIG. 1.

The blender blade spray solenoid valve of opening 28*d* turns ON for five seconds.

The blender shaft rinse solenoid valve of opening 28*f* turns ON after five seconds.

Cleaner solenoid valve 17*a* that is normally closed, water solenoid valve 5.2 that is normally closed, and valve 5.1 that is normally open are turned ON to open cleaner solenoid valve 17*a* and solenoid valve 5.2 and close valve 5.1.

The solenoid valve of opening 29*b* for Product Line 1 turns ON for fifteen seconds to clean Product Line 1, then the solenoid valve of opening 29*b* for Product Line 1 turns OFF.

The solenoid valve of opening 29*c* for Product Line 2 turns ON for fifteen seconds to clean Product Line 2, then the solenoid valve of opening 29*c* for Product Line 2 turns OFF.

The solenoid valve of opening 29*d* for Product Line 3 turns ON for fifteen seconds to clean Product Line 3, then the solenoid valve of opening 29*d* for Product Line 3 turns OFF.

The solenoid valve of opening 29*e* for Product Line 4 turns ON for fifteen seconds to clean Product Line 4, then the solenoid valve of opening 29*e* for Product Line 4 turns OFF.

The solenoid valve of opening 29*f* for Product Line 5 turns ON for fifteen seconds to clean Product Line 5, then the solenoid valve of opening 29*f* for Product Line 5 turns OFF.

The solenoid valve of opening 29*g* for Product Line 6 turns ON for fifteen seconds to clean Product Line 6, then the solenoid valve of opening 29*g* for Product Line 6 turns OFF.

The solenoid valve of opening 29*h* for Product Line 7 turns ON for fifteen seconds to clean Product Line 7, then the solenoid valve of opening 29*h* for Product Line 7 turns OFF.

The solenoid valve of opening 29*i* for Product Line 8 turns ON for fifteen seconds to clean Product Line 8, then the solenoid valve of opening 29*i* for Product Line 8 turns OFF.

Shuttle 116 moves to a position under blender blade 255 in a blend (right) position.

Blender shaft 304 of spindle assembly 242 descends to near bottom of stroke as shown in FIG. 1 and remains there for thirty seconds ("submerge" event in case there is a cup in the shuttle), then Blender shaft 304 of spindle assembly 242 ascends to top of stroke.

Shuttle 116 moves to a dispense (left) position as shown in FIG. 1.

Blender shaft 304 of spindle assembly 242 descends to near bottom of stroke as shown in FIG. 1.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for fifteen seconds to spray blender shaft 304 of spindle assembly 242 with nozzles 57, then turns OFF.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for five seconds to spray blender shaft 304 of spindle assembly 242 with nozzles 57, then blender shaft 304 of spindle assembly 242 with nozzles 57 ascends to halfway point; after another four seconds, blender shaft 304 of spindle assembly 242 with nozzles 57 ascends to top of stroke, at which point the blender shaft rinse solenoid valve of opening 28*f* finally turns OFF.

Cleaner solenoid valve 17*a* that is normally closed, water solenoid valve 5.2 that is normally closed, and valve 5.1 that is normally open are turned OFF to close cleaner solenoid valve 17*a* and solenoid valve 5.2 and open valve 5.1.

The solenoid valve of opening 28*g* for nozzles 54 and 56 of dispense area that is normally closed is turned ON to open the solenoid valve of opening 28*g* (now back to pure water mode).

The solenoid valve of opening 29*b* for Product Line 1 turns ON for twenty seconds to rinse Product Line 1, then the solenoid valve of opening 29*b* for Product Line 1 turns OFF.

The solenoid valve of opening 29*c* for Product Line 2 turns ON for twenty seconds to rinse Product Line 2, then the solenoid valve of opening 29*c* for Product Line 2 turns OFF.

The solenoid valve of opening 29*d* for Product Line 3 turns ON for twenty seconds to rinse Product Line 3, then the solenoid valve of opening 29*d* for Product Line 3 turns OFF.

The solenoid valve of opening 29*e* for Product Line 4 turns ON for twenty seconds to rinse Product Line 4, then the solenoid valve of opening 29*e* for Product Line 4 turns OFF.

The solenoid valve of opening 29*f* for Product Line 5 turns ON for twenty seconds to rinse Product Line 5, then the solenoid valve of opening 29*f* for Product Line 5 turns OFF.

The solenoid valve of opening 29*g* for Product Line 6 turns ON for twenty seconds to rinse Product Line 6, then the solenoid valve of opening 29*g* for Product Line 6 turns OFF.

The solenoid valve of opening 29*h* for Product Line 7 turns ON for twenty seconds to rinse Product Line 7, then the solenoid valve of opening 29*h* for Product Line 7 turns OFF.

The solenoid valve of opening 29*i* for Product Line 8 turns ON for twenty seconds to rinse Product Line 8, then the solenoid valve of opening 29*i* for Product Line 8 turns OFF.

After the Product Line 8 is flushed, the solenoid valve of opening 28*g* for nozzles 54 and 56 of dispense area that is normally closed is turned OFF.

Shuttle 116 moves to a dispense (left) position as shown in FIG. 1.

Blender shaft 304 of spindle assembly 242 descends to near bottom of stroke as shown in FIG. 1.

The blender shaft rinse solenoid valve of opening 28*f* that is normally closed turns ON for five seconds to spray blender shaft 304 of spindle assembly 242 with nozzles 57.

The blender blade spray solenoid valve of opening 28*d* that is normally closed turns ON for five seconds to spray the blender blade 255 with nozzle 59.

The blender shaft 304 of spindle assembly 242 with nozzles 57 ascends to the top of the stroke. The blender shaft rinse solenoid valve of opening 28*f* that is normally closed turns ON and stays ON for the entire blender shaft 304 of spindle assembly 242 with nozzles 57 ascent, before turning OFF.

The solenoid valve of opening 28*g* for nozzles 54 and 56 of dispense area that is normally closed is turned OFF to close the solenoid valve of opening 28*g* (i.e., pure water rinse is done).

During normal product process, sanitizer solenoid valve 17*b* is normally closed, water solenoid valve 5.2 is normally closed, and valve 5.1 that is normally open. When the assembly is set for the sanitation process, then both sanitizer solenoid valve 17*b* and solenoid valve 5.2 are turned ON to the open position, while valve 5.1 is turned OFF to the closed position.

The solenoid valve of opening 28*g* for nozzles 54 and 56 of dispense area that is normally closed is turned ON to open the solenoid valve of opening 28*g* for six seconds, then shuts OFF (this fills the lines up to the manifold with sanitizer solution).

The solenoid valve of opening 29*b* for Product Line 1 turns ON for eight seconds to sanitize Product Line 1, then the solenoid valve of opening 29*b* for Product Line 1 turns OFF.

The solenoid valve of opening 29*c* for Product Line 2 turns ON for eight seconds to sanitize Product Line 2, then the solenoid valve of opening 29*c* for Product Line 2 turns OFF.

The solenoid valve of opening 29*d* for Product Line 3 turns ON for eight seconds to sanitize Product Line 3, then the solenoid valve of opening 29*d* for Product Line 3 turns OFF.

The solenoid valve of opening 29*e* for Product Line 4 turns ON for eight seconds to sanitize Product Line 4, then the solenoid valve of opening 29*e* for Product Line 4 turns OFF.

The solenoid valve of opening 29*f* for Product Line 5 turns ON for eight seconds to sanitize Product Line 5, then the solenoid valve of opening 29*f* for Product Line 5 turns OFF.

The solenoid valve of opening 29*g* for Product Line 6 turns ON for eight seconds to sanitize Product Line 6, then the solenoid valve of opening 29*g* for Product Line 6 turns OFF.

The solenoid valve of opening 29*h* for Product Line 7 turns ON for eight seconds to sanitize Product Line 7, then the solenoid valve of opening 29*h* for Product Line 7 turns OFF.

The solenoid valve of opening 29*i* for Product Line 8 turns ON for eight seconds to sanitize Product Line 8, then the solenoid valve of opening 29*i* for Product Line 8 turns OFF.

Shuttle 116 moves to a position under blender blade 255 in a blend (right) position.

Blender shaft 304 of spindle assembly 242 descends to near bottom of stroke as shown in FIG. 1 and remains there for thirty seconds ("submerge" event in case there is a cup in the shuttle), then Blender shaft 304 of spindle assembly 242 ascends to top of stroke.

Shuttle 116 moves to a dispense (left) position as shown in FIG. 1.

Blender shaft 304 of spindle assembly 242 descends to near bottom of stroke as shown in FIG. 1.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for fifteen seconds to spray blender shaft 304 of spindle assembly 242 with nozzles 57, then turns OFF.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for five seconds to spray blender shaft 304 of spindle assembly 242 with nozzles 57, then blender shaft 304 of spindle assembly 242 with nozzles 57 ascends to halfway point; after another four seconds, blender shaft 304 of spindle assembly 242 with nozzles 57 ascends to top of stroke, at which point the blender shaft rinse solenoid valve of opening 28*f* finally turns OFF.

The solenoid valve of opening 29*b* for Product Line 1 turns ON for eight seconds to again sanitize Product Line 1, then the solenoid valve of opening 29*b* for Product Line 1 turns OFF.

The solenoid valve of opening 29*c* for Product Line 2 turns ON for eight seconds to again sanitize Product Line 2, then the solenoid valve of opening 29*c* for Product Line 2 turns OFF.

The solenoid valve of opening 29*d* for Product Line 3 turns ON for eight seconds to again sanitize Product Line 3, then the solenoid valve of opening 29*d* for Product Line 3 turns OFF.

The solenoid valve of opening 29*e* for Product Line 4 turns ON for eight seconds to again sanitize Product Line 4, then the solenoid valve of opening 29*e* for Product Line 4 turns OFF.

The solenoid valve of opening 29*f* for Product Line 5 turns ON for eight seconds to again sanitize Product Line 5, then the solenoid valve of opening 29*f* for Product Line 5 turns OFF.

The solenoid valve of opening 29*g* for Product Line 6 turns ON for eight seconds to again sanitize Product Line 6, then the solenoid valve of opening 29*g* for Product Line 6 turns OFF.

The solenoid valve of opening 29*h* for Product Line 7 turns ON for eight seconds to again sanitize Product Line 7, then the solenoid valve of opening 29*h* for Product Line 7 turns OFF.

The solenoid valve of opening 29*i* for Product Line 8 turns ON for eight seconds to again sanitize Product Line 8, then the solenoid valve of opening 29*i* for Product Line 8 turns OFF.

Shuttle 116 moves to a position under blender blade 255 in a blend (right) position.

Blender shaft 304 of spindle assembly 242 descends to near bottom of stroke as shown in FIG. 1 and remains there for thirty seconds ("submerge" event in case there is a cup in the shuttle), then Blender shaft 304 of spindle assembly 242 ascends to top of stroke.

Shuttle 116 moves to a dispense (left) position as shown in FIG. 1.

Blender shaft 304 of spindle assembly 242 descends to near bottom of stroke as shown in FIG. 1.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for fifteen seconds to spray blender shaft 304 of spindle assembly 242 with nozzles 57, then turns OFF.

The blender blade spray solenoid valve of opening 28*d* that is normally closed turns ON for eight seconds to spray the blender blade 255 with nozzle 59, then turns OFF.

The blender shaft rinse solenoid valve of opening 28*f* that is normally closed turns ON for five seconds to spray blender shaft 304 of spindle assembly 242 with nozzles 57, then blender shaft 304 of spindle assembly 242 with nozzles 57 ascends to halfway point; after another four seconds, blender shaft 304 of spindle assembly 242 with nozzles 57 ascends to top of stroke, at which point the blender shaft rinse solenoid valve of opening 28*f* finally turns OFF.

Sanitizer solenoid valve 17*b* that is normally closed, water solenoid valve 5.2 that is normally closed, and valve 5.1 that is normally open are turned OFF to close sanitizer solenoid valve 17*b* and solenoid valve 5.2 and open valve 5.1 (this ends the sanitation process).

The solenoid valve of opening 28*g* for nozzles 54 and 56 of dispense area that is normally closed is turned ON to open the solenoid valve of opening 28*g* for ten seconds, at which point another pure water rinse begins (now back to pure water mode).

The solenoid valve of opening 29*b* for Product Line 1 turns ON for twenty seconds to rinse Product Line 1, then the solenoid valve of opening 29*b* for Product Line 1 turns OFF.

The solenoid valve of opening 29*c* for Product Line 2 turns ON for twenty seconds to rinse Product Line 2, then the solenoid valve of opening 29*c* for Product Line 2 turns OFF.

The solenoid valve of opening 29*d* for Product Line 3 turns ON for twenty seconds to rinse Product Line 3, then the solenoid valve of opening 29*d* for Product Line 3 turns OFF.

The solenoid valve of opening 29*e* for Product Line 4 turns ON for twenty seconds to rinse Product Line 4, then the solenoid valve of opening 29*e* for Product Line 4 turns OFF.

The solenoid valve of opening 29*f* for Product Line 5 turns ON for twenty seconds to rinse Product Line 5, then the solenoid valve of opening 29*f* for Product Line 5 turns OFF.

The solenoid valve of opening 29*g* for Product Line 6 turns ON for twenty seconds to rinse Product Line 6, then the solenoid valve of opening 29*g* for Product Line 6 turns OFF.

The solenoid valve of opening 29*h* for Product Line 7 turns ON for twenty seconds to rinse Product Line 7, then the solenoid valve of opening 29*h* for Product Line 7 turns OFF.

The solenoid valve of opening 29*i* for Product Line 8 turns ON for twenty seconds to rinse Product Line 8, then the solenoid valve of opening 29*i* for Product Line 8 turns OFF.

After the Product Line 8 is flushed, the solenoid valve of opening 28*g* for nozzles 54 and 56 of dispense area that is normally closed is turned OFF to close the solenoid valve of opening 28*g*.

Shuttle 116 moves to a position under blender blade 255 in a blend (right) position, at which point "auto priming" begins.

The solenoid valve of opening 28*g* for nozzles 54 and 56 of dispense area that is normally closed is turned ON to open the solenoid valve of opening 28*g*.

Pump 1704/1706 for Product Line 1 is turned on for five or six seconds.

Pump 1704/1706 for Product Line 2 is turned on for five or six seconds.

Pump 1704/1706 for Product Line 3 is turned on for five or six seconds.

Pump 1704/1706 for Product Line 4 is turned on for five or six seconds.

Pump 1704/1706 for Product Line 5 is turned on for five or six seconds.

Pump 1704/1706 for Product Line 6 is turned on for five or six seconds.

Pump 1704/1706 for Product Line 7 is turned on for five or six seconds.

Pump 1704/1706 for Product Line 8 is turned on for five or six seconds.

The solenoid valve of opening 28*g* for nozzles 54 and 56 of dispense area that is normally closed is turned OFF to close the solenoid valve of opening 28*g*.

Shuttle 116 now moves to a dispense (left) position as shown in FIG. 1, at which point a "final rinse" begins.

The blender blade spray solenoid valve of opening 28*d* and the blender shaft rinse solenoid valve of opening 28*f* turn ON simultaneously for twelve seconds.

The solenoid valve of opening 28*g* for nozzles 54 and 56 of dispense area is turned on for twelve seconds to spray the dispense area.

The blender blade spray solenoid valve of opening 28*d* and the blender shaft rinse solenoid valve of opening 28*f* turn ON simultaneously for twelve seconds.

The solenoid valve of opening 28*g* for nozzles 54 and 56 of dispense area is turned on for twelve seconds to spray the dispense area.

The blender blade spray solenoid valve of opening 28*d* and the blender shaft rinse solenoid valve of opening 28*f* turn ON simultaneously for twelve seconds.

The solenoid valve of opening 28*g* for nozzles 54 and 56 of dispense area is turned on for twelve seconds to spray the dispense area. All of the product lines are now completely flushed out, cleaned, sanitized and totally free of beverage product.

Figure 6:
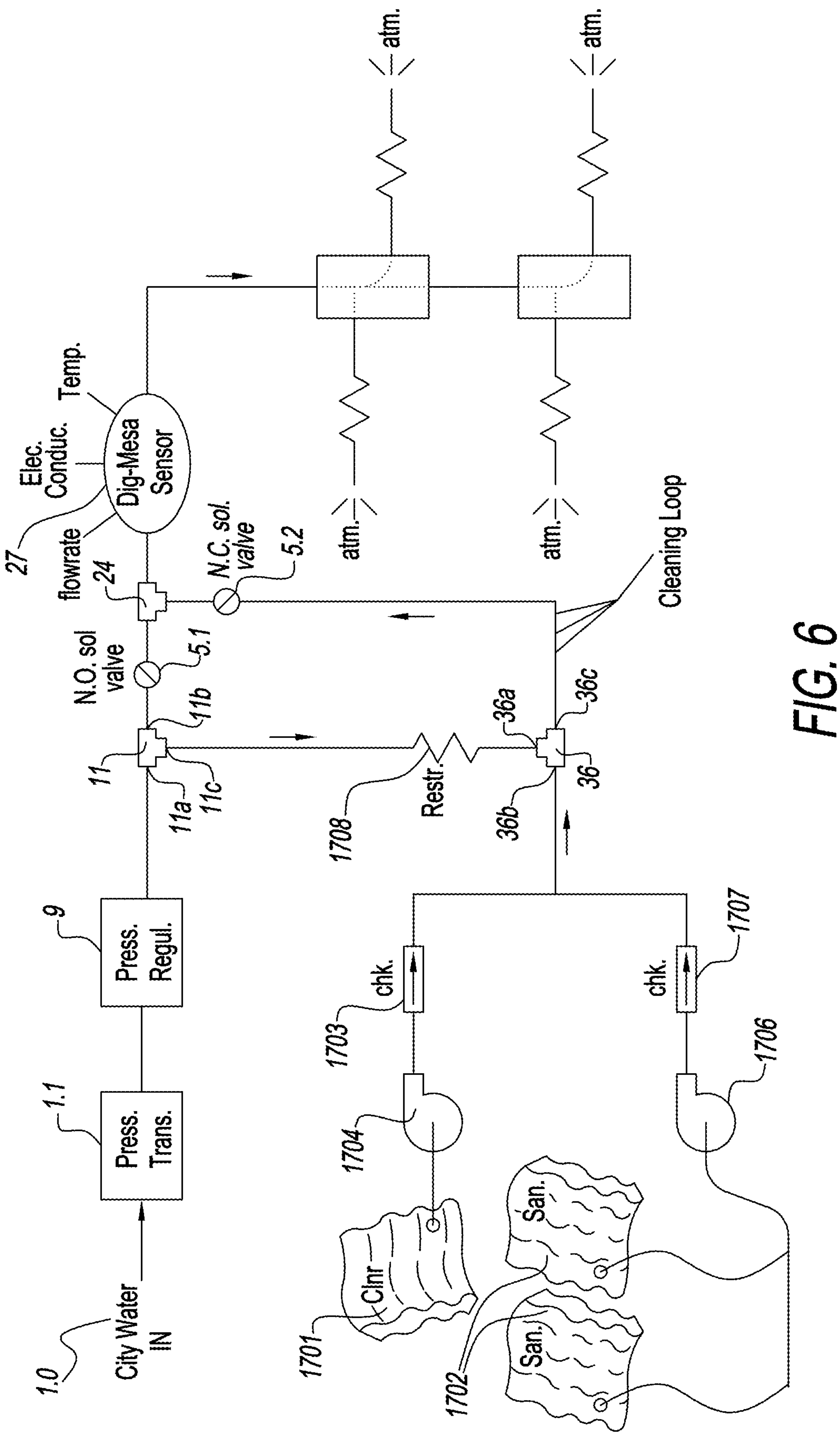
FIG. 6 is a diagram of a sanitation system of the beverage dispenser that can be used with the cleaning assembly of FIG. 1 having some features omitted for clarity and shown in an alternative embodiment.

Referring to FIG. 6, is a plumbing schematic of beverage dispenser 10, showing an alternative embodiment of FIG. 1 that includes cleaning container 1701, sanitizer container(s) 1702, cleaning pump 1704, sanitizer pump 1706 and pressure changing device 1708. Pressure changing device 1708 could be a pressure reducer or pressure regulator. In addition, valve 24 is modified to omit valve 5.1. An input of pressure changing device 1708 is connected between pressure regulator or pressure restrictor 9 and valve 24 and an output of pressure changing device 1708 connects to solenoid valve 5.2. A first check valve 1703 is connected downstream of cleaning pump 1704 and a second check valve 1707 is connected downstream of sanitizer pump 1706. Check valves 23, 1703, and 1707 do not have to exist simultaneously in the same embodiment and check valve 23, and/or check valves 1703 and 1707, can be used independently from each other. However, other embodiments eliminate one or both check valves 1703 and 1707, while others may include a check valve after the convergence point of two chemical paths, just before T-fitting 36. Still other embodiments might have only one chemical bag and one pump. The "diverted" flow path created by closing 5.1 and opening 5.2 (assuming an MVO state) is herein known as the Cleaning Loop. It consists of a path beginning at 11*c*, through the pressure reduction device 1708, through T-fitting 36 via 36*a* and 36*c*, through solenoid valve 5.2 and ending at T-fitting 24. During cleaning or sanitizing, the water flow enters the Cleaning Loop at T-fitting 11, picks up some cleaner and/or sanitizer at T-fitting 36 (herein known as the "Injection Point"), and passes through solenoid valve 5.2 and T-fitting 24, on its way to the combination sensor 27 and beyond. Certain embodiments may have need for the flow rate through the Cleaning Loop to be significantly less than the normal "non cleaning" flow rate. Such a planned flow reduction may be accomplished by the pressure reduction device 1708. If no flow reduction is desired or needed, 1708 may be eliminated. In such cases, alternative embodiments may also be employed, as shown in FIGS. 11-17. In these embodiments, there is no Cleaning Loop, and T-fitting 36 (the Injection Point) is at or just before solenoid valve 5.2. In such other embodiments, the "normally open" solenoid valve 5.1 would not be needed at all.

Figure 7:
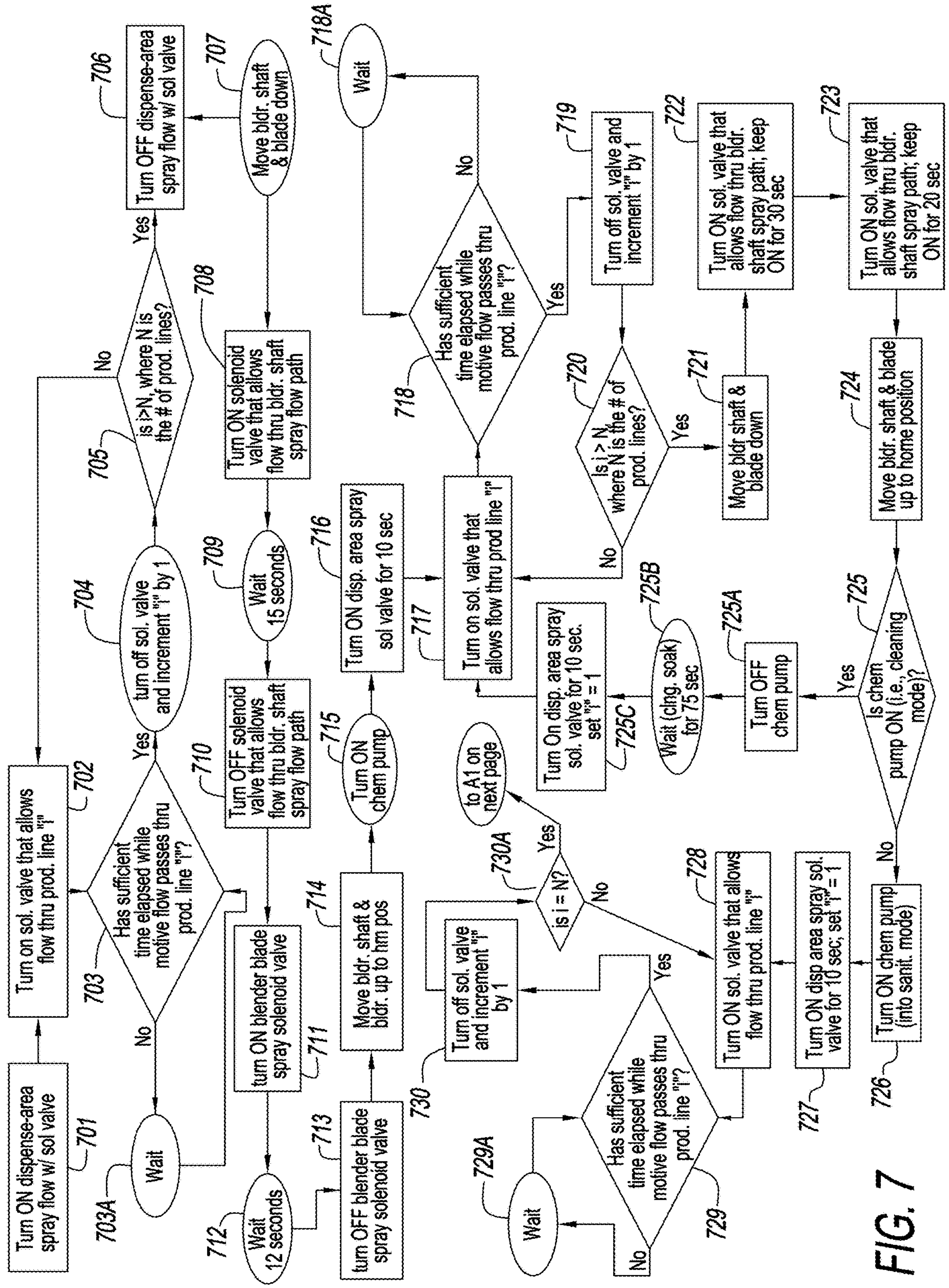
FIG. 7 is a flow chart of a cleaning and/or sanitizing process of the beverage dispenser that can be used with the cleaning assembly of FIG. 1 and shown in FIG. 6, and FIGS. 11-17.

Referring to FIG. 7, an example of steps for a process for weekly cleaning of beverage dispenser 10 as controlled by controller 800 is as follows:

Step 701—Turn on Turn ON dispense-area spray flow with solenoid valve.

Step 702—Turn on solenoid valve that allows flow through product line "i."

Step 703—Has sufficient time elapsed while motive flow passes through product line "i?"

If no, Step 703A—Wait until sufficient time has elapsed and then proceed to Step 704.

If yes, Step 704—Turn off solenoid valve and increment "i" by 1.

Step 705—Is i>N, where N is the number of product lines?

If no, repeat the process from Step 702.

If yes, Step 706—Turn OFF dispense-area spray flow with solenoid valve.

Step 707—Move blender shaft and blade down.

Step 708—Turn ON solenoid valve that allows flow through blender shaft spray flow path.

Step 709—Wait 15 seconds.

Step 710—Turn OFF solenoid valve that allows flow through blender shaft spray flow path.

Step 711—Turn ON blender blade spray solenoid valve.

Step 712—Wait 12 seconds.

Step 713—Turn OFF blender blade spray solenoid valve.

Step 714—Move blender shaft and blender up to home position.

Step 715—Turn on chemical pump.

Step 716—Turn ON dispense-area spray solenoid valve for 10 seconds.

Step 717—Turn on solenoid valve that allows flow through product line "i."

Step 718—Has sufficient time elapsed while motive flow passes through product line "i?"

If no, Step 718A—Wait until sufficient time has elapsed and then proceed to Step 719.

If yes, Step 719—Turn off solenoid valve and increment "i" by 1.

Step 720—Is i>N, where N is the number of product lines?

If no, repeat the process from Step 717.

If yes, Step 721—Move blender shaft and blade down.

Step 722—Turn ON solenoid valve that allows flow through blender shaft spray path and keep ON for 30 seconds.

Step 723—Turn ON solenoid valve that allows flow through blender blade spray path and keep ON for 20 seconds.

Step 724—Move blender shaft and blade up to home position.

Step 725—Is chemical pump ON (i.e., cleaning mode)??

If yes, Step 725A—Turn OFF chemical pump.

Then, Step 725B—Wait for a cleaning soak for 75 seconds.

Then, Step 725C—Turn ON dispense-area spray solenoid valve for 10 seconds and set "i"=1.

The repeat the process from Step 717.

If no, Step 726—Turn ON chemical pump (into sanitation mode).

Then, Step 727—Turn ON dispense-area spray solenoid valve for 10 seconds and set "i"=1.

Then, Step 728—Turn ON solenoid valve that allows flow through product line "i."

Then, Step 729—Has sufficient time elapsed while motive flow passes through product line "i?"

If no, Step 729A—Wait until sufficient time has elapsed and then proceed to Step 730.

Step 730—Turn off solenoid valve and increment "i" by 1.

Step 730A—Is i=N?

If no, repeat the process from Step 728.

Figure 8:
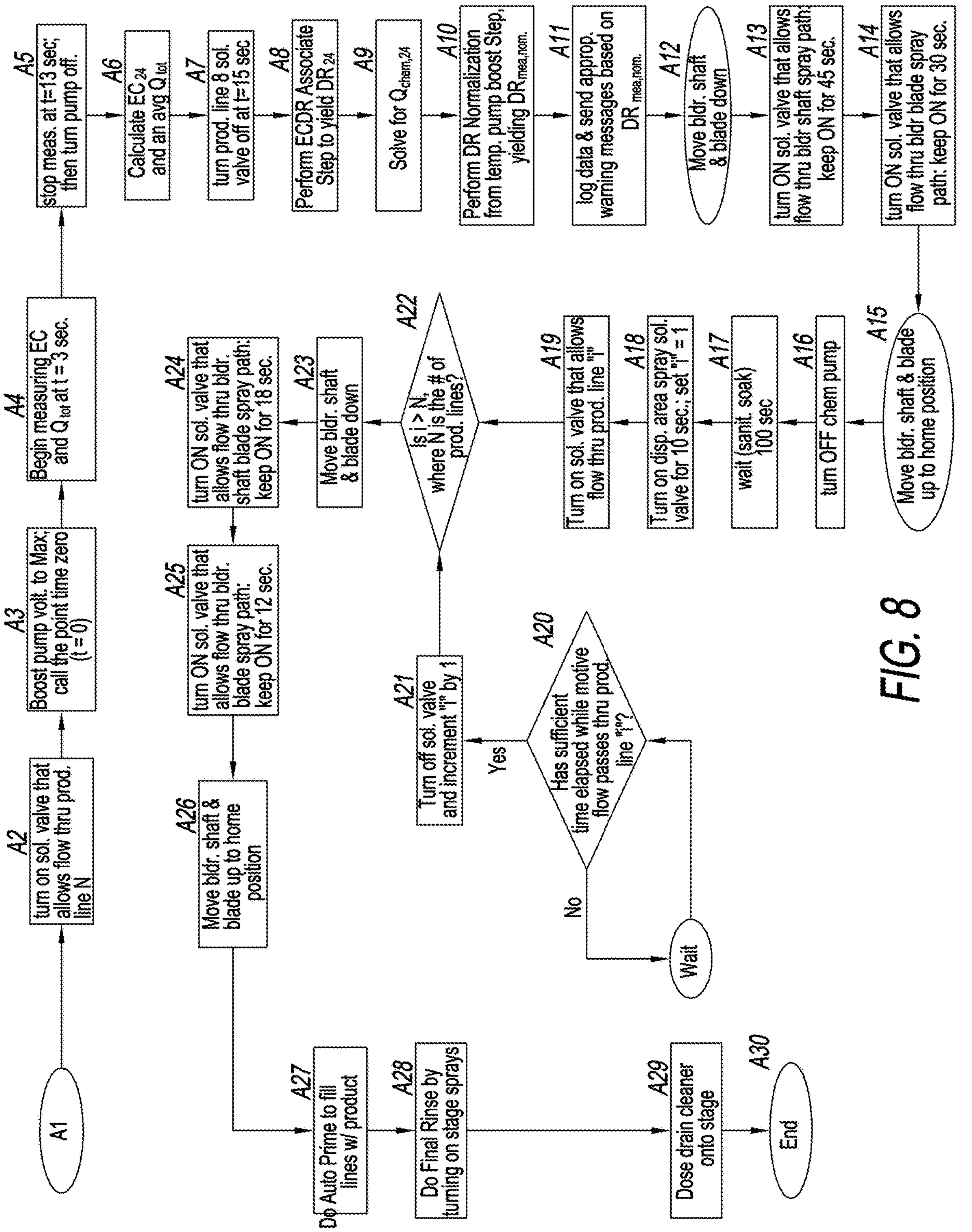
FIG. 8 is a flow chart of a cleaning and/or sanitizing process of the beverage dispenser, wherein utilizing an electrical conductivity to dilution ratio is measured that can be used with the cleaning assembly of FIG. 1 and shown in FIG. 6, and FIGS. 11-17.

If yes, proceed to A1, as shown in FIG. 8.

Referring to FIG. 8, an example of steps for a process of utilizing an electrical conductivity (EC) to dilution ratio (DR) measurement of a mixture of water and cleaning and/or sanitizing solution of beverage dispenser 10 as controlled by controller 800 is as follows:

From the final step A1 of the Weekly Cleaning process, proceed to Step A2 of the EC to DC measurement process.

Step A2—Turn on solenoid valve that allows flow through product line N.

Step A3—Boost pump voltage to Max and that point time is zero (t=0).

Step A4—Begin measuring electrical conductivity (EC) and $Q_{tot}$ at t=3 seconds.

Step A5—Stop measuring at t=13 second; and then turn pump off.

Step A6—Calculate EC24 and an average $Q_{tot}$.

Step A7—Turn product line 8 solenoid valve off at t=15 seconds.

Step A8—Perform ECDR Associate Step to yield $DR_{24}$.

Step A9—Solve for $Q_{chem,24}$.

Step A10—Perform dilution ratio (DR) normalization from temporary pump boost Step, yielding $DR_{mea,nom}$.

Step A11—Log data and send appropriate warning messages based on $DR_{mea,nom}$.

Step A12—Move blender shaft and blade down.

Step A13—Turn ON solenoid valve that allows flow through blender shaft spray path; and keep ON for 45 seconds.

Step A14—Turn ON solenoid valve that allows flow through blender blade spray path; and keep ON for 30 seconds.

Step A15—Move blender shaft and blade up to home position.

Step A16—Turn OFF chemical pump.

Step A17—Wait (sanitation soak) for 100 seconds.

Step A18—Turn ON dispense-area spray solenoid valve for 10 sec and set "i"=1.

Step A19—Turn on solenoid valve that allows flow through product line "i."

Step A20—Has sufficient time elapsed while motive flow passes through product line "i?"

If no, Step B20—Wait until sufficient time has elapsed and then proceed to Step A21.

If yes, Step A21—Turn off solenoid valve and increment "i" by 1.

Step A22—Is i>N, where N is the number of product lines?

If no, repeat the process from Step A19.

If yes, Step A23—Move blender shaft and blade down.

Step A24—Turn ON solenoid valve that allows flow through blender shaft spray path; and keep ON for 18 seconds.

Step A25—Turn ON solenoid valve that allows flow through blender blade spray path; and keep ON for 12 seconds.

Step A26—Move blender shaft and blade up to home position.

Step A27—Do Auto Prime to fill lines with product.

Step A28—Do Final Rinse by turning on stage sprays.

Step A29—Dose drain cleaner onto stage.

Then Step A30—End of the process of utilizing an electrical conductivity (EC) to dilution ratio (DR) measurement of a mixture of water and cleaning and/or sanitizing solution of beverage dispenser 10.

Figure 17A:
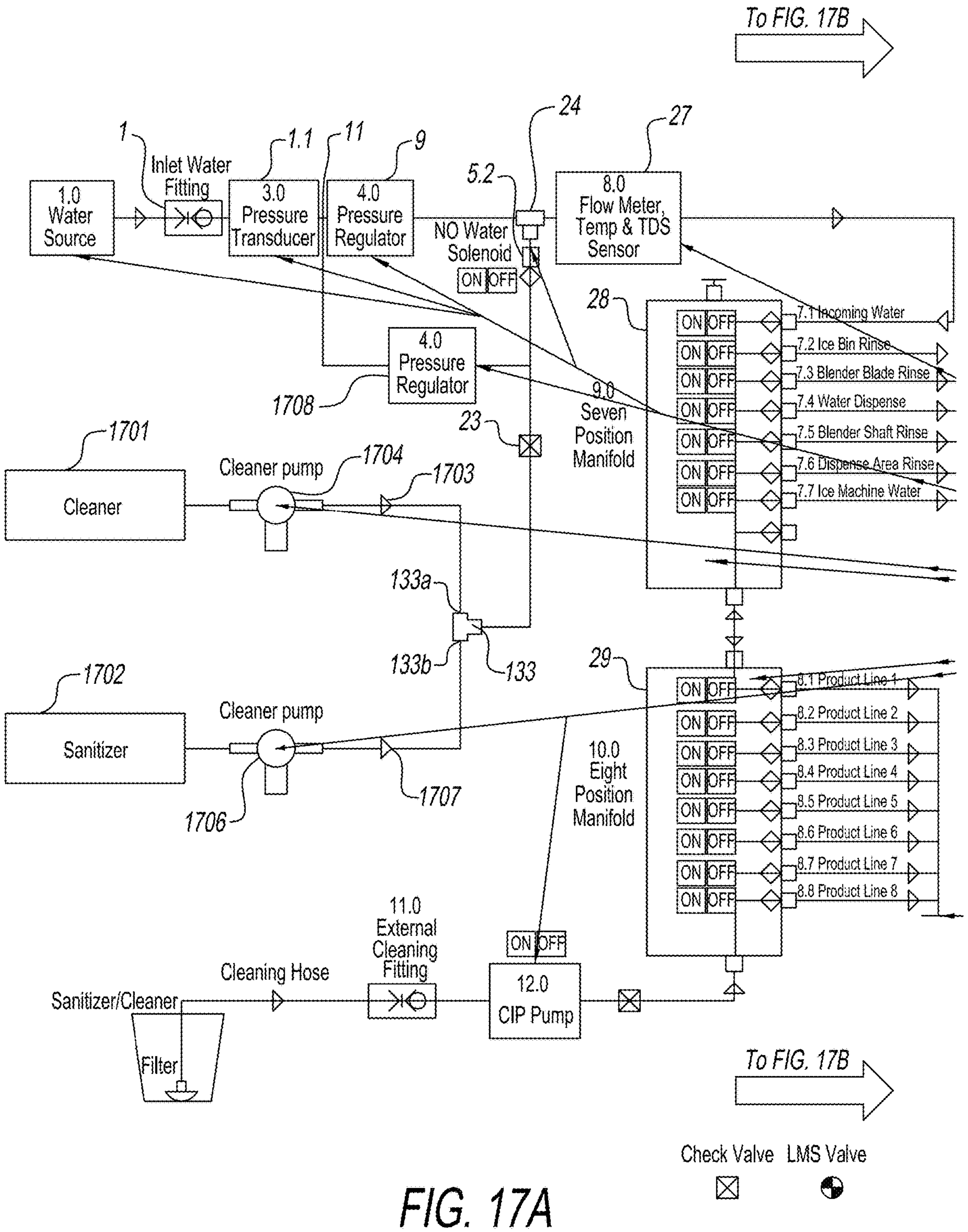
FIGS. 17A and 17B when assembled with FIG. 17A to the left and FIG. 17B to the right, constitute FIG. 17 and is a plumbing schematic of a sanitation system of the beverage dispenser that can be used with the cleaning assembly of FIG. 1, and further illustrating the control system, wherein the processor is shown to control the valves, pumps, containers of the rinsing, cleaning and/or sanitizing of the beverage dispenser, as well as beverage dispensing.
Figure 17B:
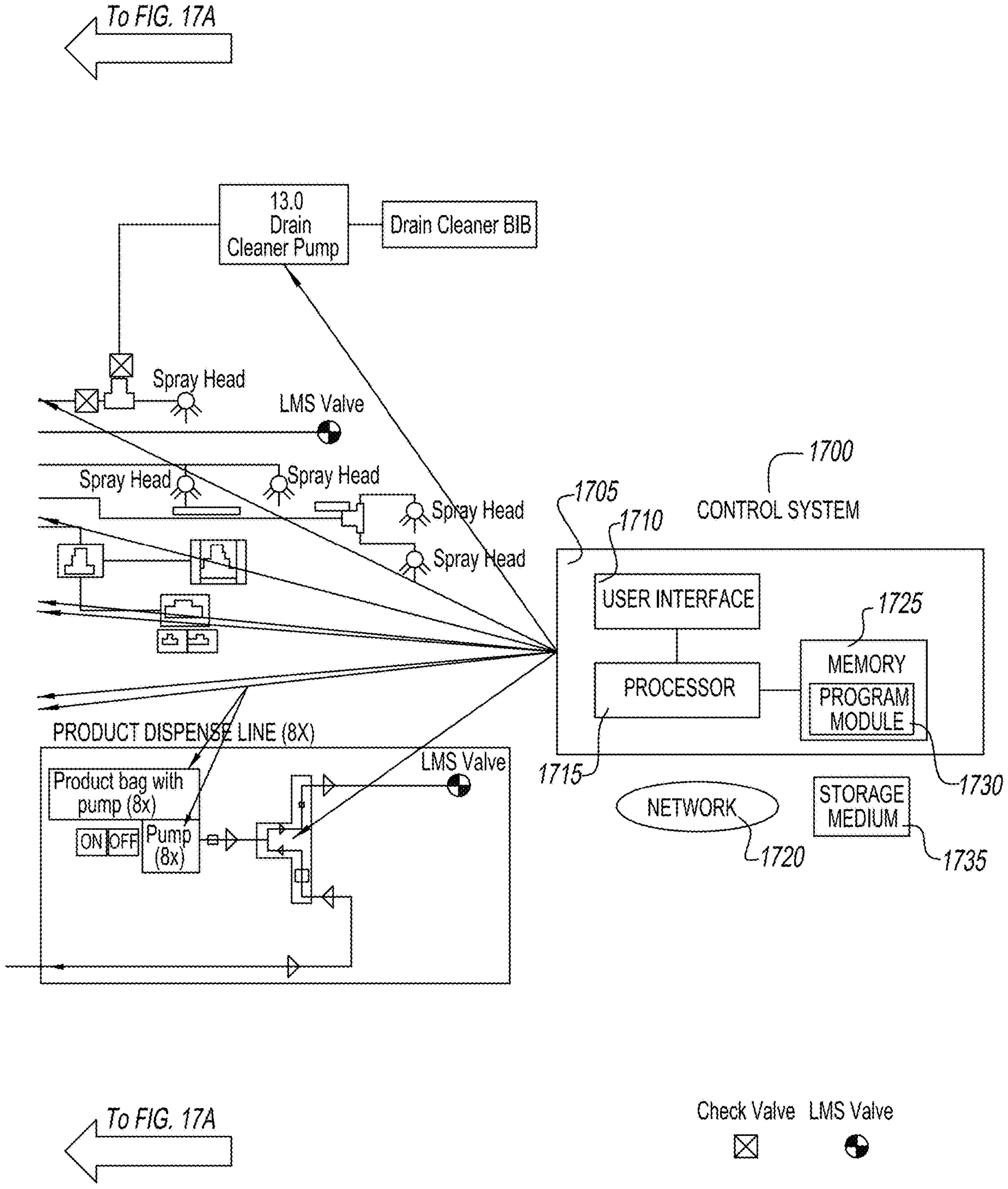

Referring to FIGS. 17A and 17B, when assembled with FIG. 17A to the left and FIG. 17B to the right, constitute FIG. 17, a plumbing schematic of beverage dispenser 10 including a cleaning container 1701, a sanitizer container 1702, a cleaning pump 1704, a sanitizer pump 1706 and a pressure changing device 1708. Pressure changing device 1708 could be a pressure reducer or pressure regulator. In addition, valve 24 is a simple tee fitting 24 and has been modified to omit valve 5.1. An input of pressure changing device 1708 is connected between transducer 1.1, T-fitting 11 and pressure regulator or pressure restrictor 9 and tee fitting 24, and an output of pressure changing device 1708 connects to and is between standalone and "normally closed" solenoid valve 5.2 and check valve 23. However, check valve 23 is not essential to the embodiment. Second opening 133*a* of wye fitting 22 is connected to cleaning pump 1704 that is connected to cleaner container 1701. Third opening 133*b* of wye fitting 22 is connected to sanitizer pump 1706 that is connected to sanitizer container 1702. A first check valve 1703 is connected downstream of cleaning pump 1704 and a second check valve 1707 is connected downstream of sanitizer pump 1706. Check valves 23, 1703, and 1707 do not have to exist simultaneously in the same embodiment and check valve 23, and/or check valves 1703 and 1707, can be used independently from each other. However, other embodiments eliminate one or both check valves 1703 and 1707, while others may include a check valve after the convergence point of two chemical paths, just before T-fitting 36. Still other embodiments might have only one chemical bag and one pump. The "diverted" flow path created by closing 5.1 and opening 5.2 (assuming an MVO state) is herein known as the Cleaning Loop. It consists of a path beginning at 11*c*, through the pressure reduction device 1708, through T-fitting 36 via 36*a* and 36*c*, through solenoid valve 5.2 and ending at T-fitting 24. During cleaning or sanitizing, the water flow enters the Cleaning Loop at T-fitting 11, picks up some cleaner and/or sanitizer at T-fitting 36 (herein known as the "Injection Point"), and passes through solenoid valve 5.2 and T-fitting 24, on its way to the combination sensor 27 and beyond. Certain embodiments may have need for the flow rate through the Cleaning Loop to be significantly less than the normal "non cleaning" flow rate. Such a planned flow reduction may be accomplished by the pressure reduction device 1708. If no flow reduction is desired or needed, 1708 may be eliminated. In such cases, alternative embodiments may also be employed, as shown in FIG. 6, and FIGS. 11-16. In these embodiments, there is no Cleaning Loop, and T-fitting 36 (the Injection Point) is at or just before solenoid valve 5.2. In such other embodiments, the "normally open" solenoid valve 5.1 would not be needed at all.

Referring further to FIGS. 17A and 17B, which constitute FIG. 17, beverage dispenser 10 is shown as a block diagram with control system 1700, for employment of the present invention. Control system 1700 includes a computer 1705 coupled to a network 1720, e.g., the Internet.

Computer 1705 includes a user interface 1710, a processor 1715, and a memory 1725. Computer 1705 may be implemented on a general-purpose microcomputer. Although computer 1705 is represented herein as a stand-alone device, it is not limited to such, but instead can be coupled to other devices (not shown) via network 1720.

Processor 1715 is configured of logic circuitry that responds to and executes instructions. Processor 1715 controls all valves, pumps, containers. Processor 1715 may be configured and programmed to control the beverage dispensing as well as the rinsing, cleaning and/or sanitizing of the beverage dispenser 10.

Memory 1725 stores data and instructions for controlling the operation of processor 1715. Memory 1725 may be implemented in a random-access memory (RAM), a hard drive, a read-only memory (ROM), a programmable read-only memory (PROM), or a combination thereof. One of the components of memory 1725 is a program module 1730.

Program module 1730 contains instructions for controlling processor 1715 to execute the methods described herein. For example, as a result of execution of program module 1730, processor 1715 compares a current time to a predetermined time, then determines if a current time equals a predetermined time, and if the current time equals the predetermined time, then commences a cleaning or sanitizing process of the beverage dispenser. The term "module" is used herein to denote a functional operation that may be embodied either as a stand-alone component or as an integrated configuration of a plurality of sub-ordinate components. Thus, program module 1730 may be implemented as a single module or as a plurality of modules that operate in cooperation with one another. Moreover, although program module 1730 is described herein as being installed in memory 1725, and therefore being implemented in software, it could be implemented in any of hardware (e.g., electronic circuitry), firmware, software, or a combination thereof.

User interface 1710 includes an input device, such as a display with multi-touch interface, keyboard, biometrics or speech recognition subsystem, for enabling a user to communicate information and command selections to processor 1715. User interface 1710 also includes an output device such as audio, display, and/or haptic feedback. A cursor control such as a mouse, trackball, or joystick, allows the user to manipulate a cursor on the display for communicating additional information and command selections to processor 1715.

Processor 1715 outputs, to user interface 1710, a result of an execution of the methods described herein. Alternatively, processor 1715 could direct the output to a remote device (not shown) via network 1720.

While program module 1730 is indicated as already loaded into memory 1725, it may be configured on a storage medium 1735 for subsequent loading into memory 1725. Storage medium 1735 can be any conventional storage medium that stores program module 1730 thereon in tangible form. Examples of storage medium 1735 include a floppy disk, a compact disk, a magnetic tape, a read only memory, an optical storage media, a universal serial bus (USB) flash drive, a secure digital (SD) card, a digital versatile disc, or a zip drive. Alternatively, storage medium 1735 can be a random-access memory, or other type of electronic storage, located on a remote storage system and coupled to computer 1705 via network 1720.

Advantageously, cleaning beverage dispenser 10 does not require operators of beverage dispenser 10 to remember to perform cleaning and/or sanitizing process 1001. In addition, another advantage is, all the chemicals are onboard cleaning beverage dispenser 10, and structure and software exist to automatically do the cleaning without an operator. The structure and logic itself prevent operators from having to hook up cleaning buckets to cleaning beverage dispenser 10. Another advantage is that the cleaning assembly of dispenser 10 can clean all of the food contact surfaces and can be a fully automatic system that includes a supply of liquid cleaner and/or liquid sanitizer for about 6 months.

Also, there are several "loops" in the cleaning cycles. The preferred order in which the valves are opened to properly clean the system or to maximize cleaning efficiency is to clean the product lines first and then clean everything else after. This is done to try and ensure that the maximum amount of product is removed off the stage area and drain area by using the water and cleaner dispensed from the other outlets.

Figure 9:
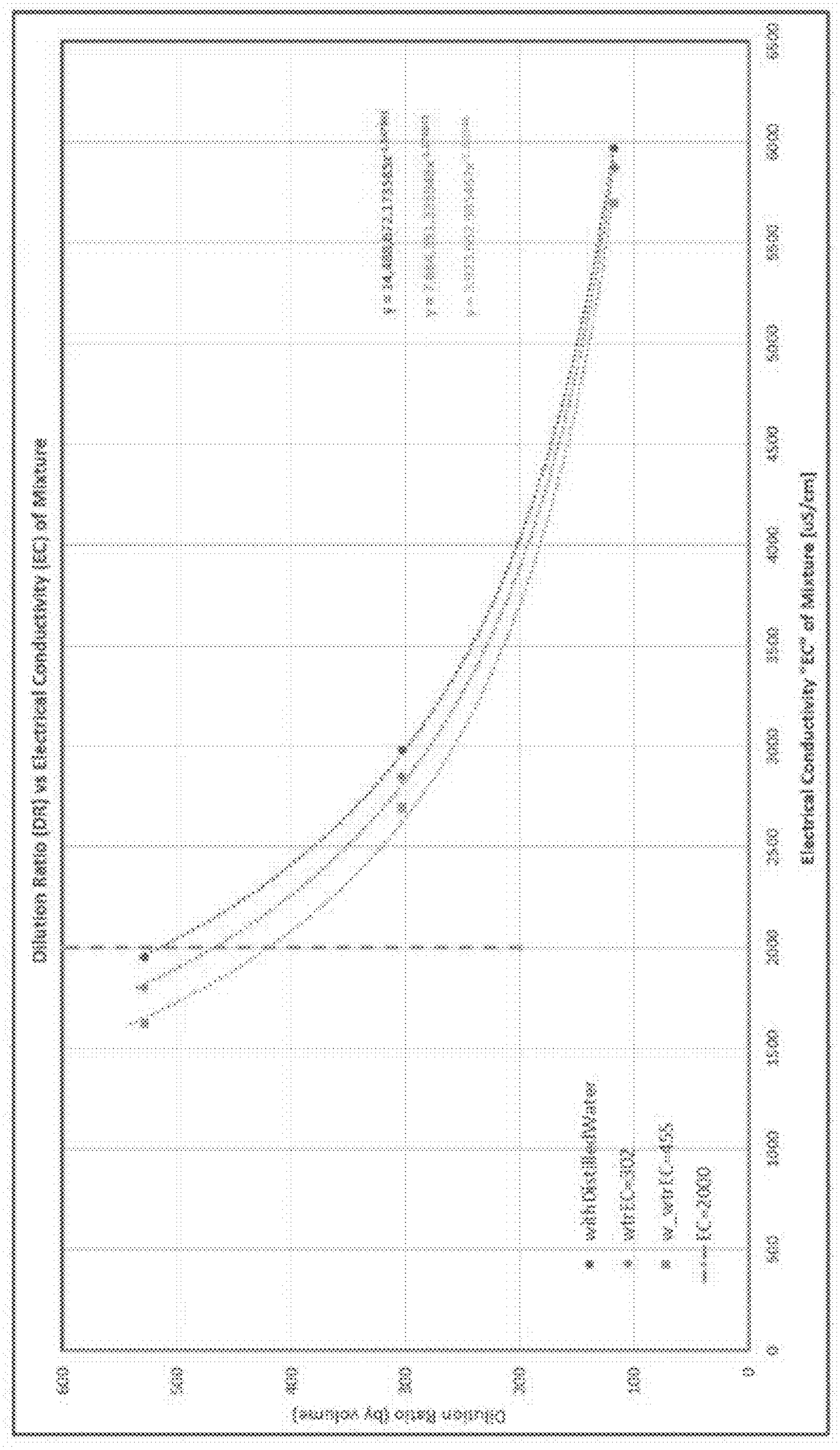
FIG. 9 is a graph of a measurement of an electrical conductivity to dilution ratio of a mixture of water and cleaning and/or sanitizing solution, which can be measured by utilizing a combination sensor and shown in FIG. 6, and FIGS. 11-17.
Figure 10:
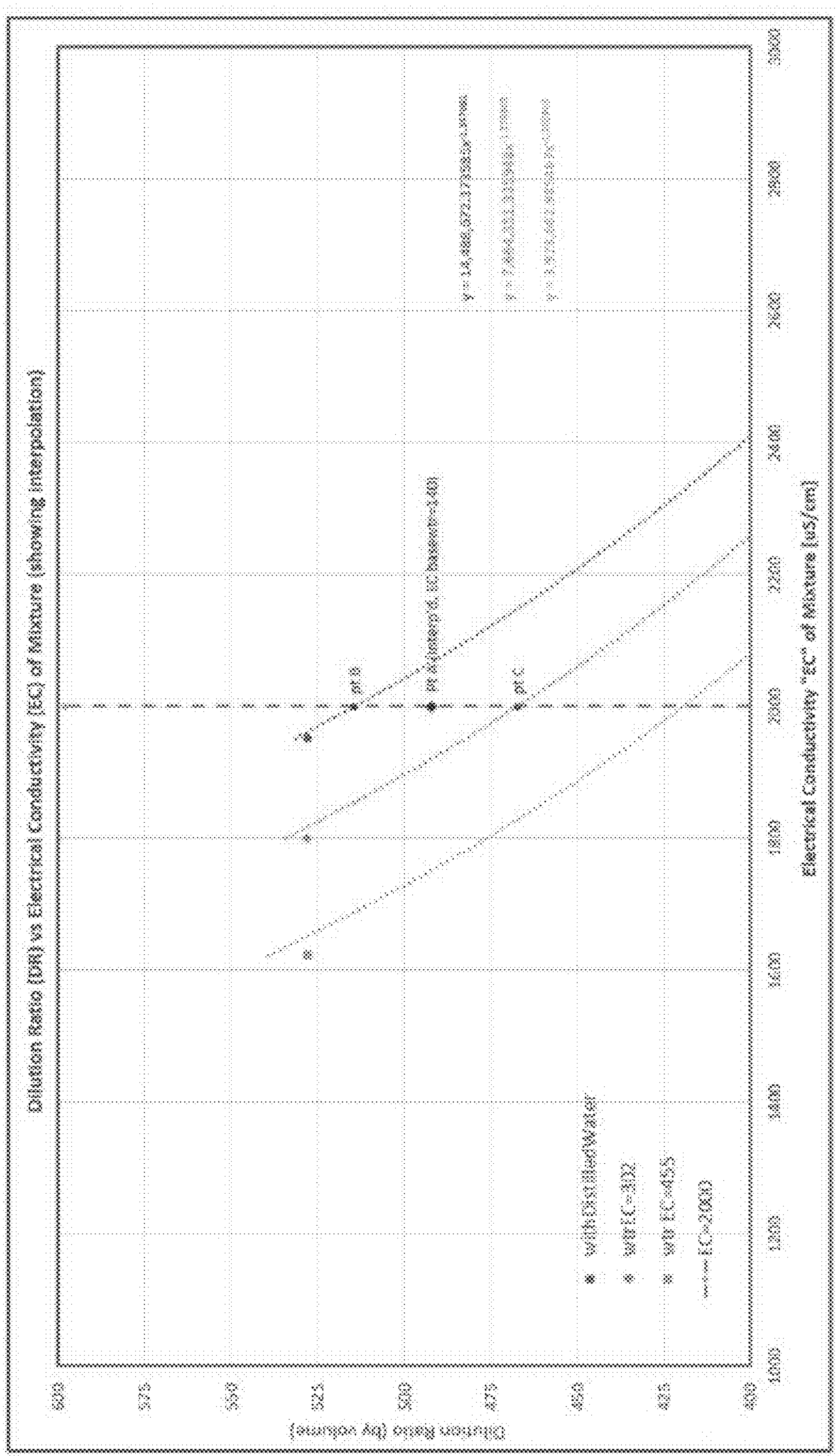
FIG. 10 is a graph showing an interpolation of a measurement of an electrical conductivity to dilution ratio of a mixture of water and cleaning and/or sanitizing solution, which can be measured by utilizing a combination sensor and shown in FIG. 6, and FIGS. 11-17.
Figure 11:
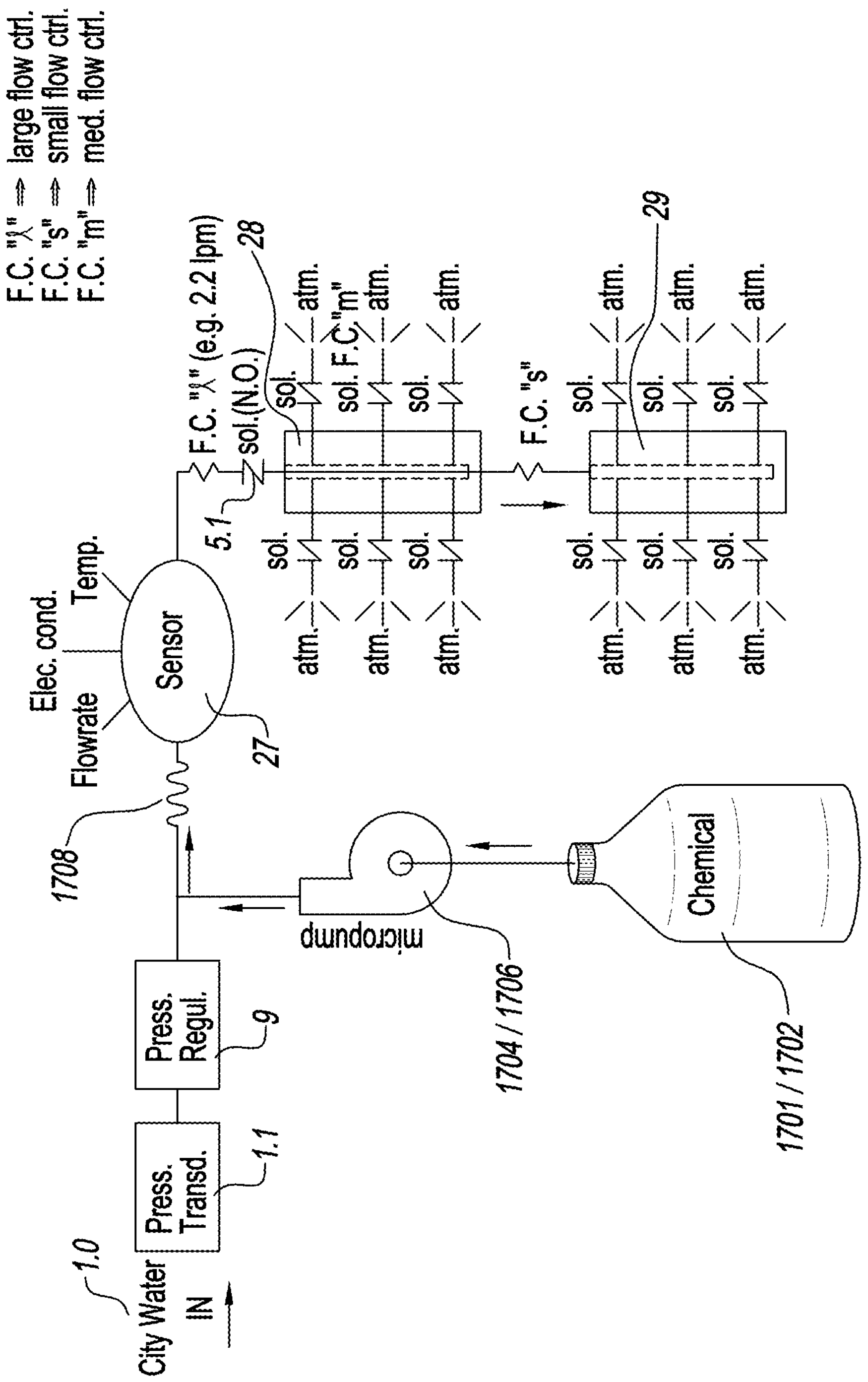
FIG. 11 is a diagram of a sanitation system of the beverage dispenser that can be used with the cleaning assembly of FIG. 1 having some features omitted for clarity and shown in an alternative embodiment.

Determining the Dilution Ratio (Strength) of the Chemical Mixture Created by the Beverage Dispenser Referring to FIG. 9 and FIG. 10, in the present disclosure, another embodiment of the invention comprises measuring the Total Dissolved Solids (TDS) or Electrical Conductivity (EC) of the chemical mixture being sent to the lines, components, and regions of the machine to be cleaned or sanitized. Any flow circuit, or portion thereof, in the beverage machine that may need to be cleaned/sanitized is herein referred to as a Cleanable Circuit. A Cleanable Circuit may include at least one of: tubing, fittings, sensors, flow controls, restrictors, regulators, or nozzles. Since a TDS reading is obtained by applying a conversion factor for natural waters to an EC reading, the terms TDS and EC herein will be considered equivalent. The resulting chemical mixture created by mixing the pump's chemical output with a line containing the "motive" flow (typically city water) is required to be within certain concentration limits. These are often established in parts per million, where the "part" refers to one of the important components within the chemical. These "ppm" values are directly related to a more useful parameter, referred to herein as, Dilution Ratio. Regardless of the various important components within the raw chemical, the Dilution Ratio is herein defined as the amount of water per amount of raw chemical, in the mixture. In other words, units of water per unit of chemical, where the unit is one of a volume or mass unit (e.g., ml or grams). However, in the embodiments described hereinafter, Dilution Ratio (DR) is volume-based.

In the present disclosure, the onboard EC/TDS sensor measures the EC of the chemical mixture flowing through it. For the raw chemical of interest, the relationship between the DR of the chemical mixture and the EC of this mixture is established beforehand by testing. Once the relationship between DR and EC is obtained, it can be shown in graph or tabular form, and by one or more best-fit equations. Thus, various embodiments of the invention utilize the EC vs DR (y-axis vs x-axis) equation. Further, the relationship can often be represented via a polynomial, although power functions or any other type of mathematical function may sometimes be utilized. Each of these types of equations can be represented by a few "coefficients" or "constants." In the case of a $2^{nd}$-order polynomial (y=ax2+bx+c), there would be three "coefficients" required to define the relationship: the "a", "b" and "c." The process of storing these "coefficients" (utilizing EC vs DR) onto the machine's computer will be referred to herein as an ECDR Storage Step. These various coefficients can be stored in a variety of ways . . . in .xml, .ini or .txt files, which are read by the controlling program, for instance.

In the present disclosure, the preferred embodiments utilize "up front" testing using the same exact sensor model/type that will be used on the machine during actual cleaning/sanitizing. In the example described below, three separate mixture ratios are created:

The first is 117.3-unit volumes of water to 1 unit volume of raw chemical. Once mixed, the contents are placed into a container, with a pump drawing from the container and recirculating back into it. The EC/TDS sensor is placed in series with the pump, allowing a good average reading to be obtained within a minute or two. The contents are dumped, the sensor and pump and lines flushed with water and blown dry, and then a 303:1 ratio is added to the container. The process is repeated. The same is then done with a 528:1 ratio. Therefore, the result is a relationship of EC to DR for this chemical. It is noted that some chemicals can be more sensitive to the exact "type" of water used. The above process can be done for several different water types, for instance, using water obtained from different locales or cities. Further, for example, the machine would then use the equations most closely associated with the city water where it is located. While some qualities of the "base water" that might create a need to perform measurements with different water "types" are likely unknown or at least not closely related to EC, it appears probable that the EC of the base water itself often has some effect on the EC of the resulting mixtures. Thus, one may obtain EC vs. DR relationships for several different "water EC" levels, with the machine ultimately using the equations corresponding most closely to the local water's EC value (which can be easily measured with the EC sensor). Certain chemicals may result in a very weak relationship between base water quality/type and EC of the resulting mixture. The relationship is typically further weakened when fairly low DR's are used (i.e., less water, more chemical). In these cases, one may choose to simplify things and only have one set of data coupling mixture EC to Dilution Ratio.

The next example has the process described above performed three times, each corresponding to a significantly different "base water" EC value. An EC vs DR relationship for each chemical mixture is then obtained. Three different "base water" types will be carefully mixed with the chemical: 1) distilled water (EC approximately zero), 2) city water with EC of about 300, and 3) city water with EC of 460. The units of EC herein are microSiemens per cm [uS/cm].

With distilled water as the "base water," a given cleaner/sanitizer chemical mixture results in the following (in all cases, DR is by volume):

Mixture DR set to 117.3 to 1; resulting mixture EC found to be 5970 uS/cm

Mixture DR set to 303 to 1; resulting mixture EC found to be 2985 uS/cm

Mixture DR set to 528 to 1; resulting mixture EC found to be 1952 uS/cm

With a water EC value of 302 as the "base water," the given cleaner/sanitizer chemical mixture results in the following:

Mixture DR set to 117.3 to 1; resulting mixture EC found to be 5870 uS/cm

Mixture DR set to 303 to 1; resulting mixture EC found to be 2850 uS/cm

Mixture DR set to 528 to 1; resulting mixture EC found to be 1801 uS/cm

With a water EC value of 455 as the "base water," the given cleaner/sanitizer chemical mixture results in the following:

Mixture DR set to 117.3 to 1; resulting mixture EC found to be 5700 uS/cm

Mixture DR set to 303 to 1; resulting mixture EC found to be 2700 uS/cm

Mixture DR set to 528 to 1; resulting mixture EC found to be 1623 uS/cm

The resulting graphs of all three "base water" cases are shown in FIG. 9. The resulting equations are also shown in FIG. 9. In this example, a best-fit power function works best for all three datasets. This involves only two "coefficients" for each equation: the first factor and the exponent of the "x" variable. Once these "coefficients" are stored on the machine, an EC measurement of the cleaner/sanitizer mixture flowing through the machine's EC/TDS sensor can be associated with a specific Dilution Ratio.

The process of associating a chemical mixture's EC value—obtained via the EC/TDS sensor—with a Dilution Ratio is herein referred to as an ECDR Associate Step. The ECDR Associate Step comprises plugging a measured EC value (taken by the EC/TDS sensor on the machine) into an appropriate DR vs. EC equation, to obtain the Dilution Ratio of the flowing mixture. Further, the EC value is automatically fed into the appropriate DR vs. EC equation by the controlling computer and is "mapped" to an appropriate DR value by the controlling computer, based on stored tabular data. Thus, in this example, if the base water flowing through the machine was found to have an EC of exactly 302, then the "orange curve" relationship of FIG. 9 would be used to get the DR. If the machine's base water instead had an EC of exactly 455, then the "gray curve" relationship would be used.

Referring to FIG. 10, if the base water is found to have an EC between 302 and 455, then simple interpolation would be used to determine the DR of the mixture. It is best to have EC vs. DR data for more base water EC values (e.g., perhaps all the way up to 1000 uS/cm base water). Therefore, the interpolation would always be done between the nearest two known relationships/equations (nearest in terms of the base water EC).

The ECDR Storage Step is herein further defined to potentially include the storage of several separate DR vs. EC relationships, each corresponding to a significantly different level of base water EC. However, the following reveals that interpolation between "base water EC" values is only necessary for EC's or DR's corresponding to the left (steeper) portion of the curves. The spread between the three curves over in the right/flatter region is so small that one could use any of the three relationships alone, and still get a useful value for DR.

Moreover, it is clear from the foregoing three graphs that there is further reason to do any real-time measuring of a chemical mixture's EC on stronger mixtures, if given a choice. Any given uncertainty of the EC measurement results in much less uncertainty in the value of DR, over in the "flatter" portion of these curves. So, in addition to stronger mixtures benefitting from merely having less water (which can have unmeasured qualities that affect the mixture), these stronger mixtures also correspond to more forgiving regions of the DR vs. EC curve/relationship.

Referring to FIG. 10, a further example is given, using the same three equations, for a case where an EC is measured that corresponds to the steeper portion of the curves, thus making the interpolation beneficial. FIG. 10 is identical to FIG. 9 but is zoomed into the region of interest. The sensor measures an EC of 2000 uS/cm. The base water EC is measured at 140 uS/cm. Utilizing "distilled" base water, the DR is mistakenly found to be 514 (point B in FIG. 10). If utilizing a base water EC of 302, the DR is 467 (point C in FIG. 10). However, if the interpolation between the two curves/equations is based on the base water EC value, the result is a more accurate value of 492 for the DR (point A in FIG. 10). The interpolation equation would be:

$$DR = 514 + \frac{(140 - 0)}{(302 - 0)}[467 - 514] = 492$$

A preferred embodiment utilizes this measurement by (a) over a significant (e.g., 8 seconds or longer) period of time, and (b) under conditions approaching a steady state. The latter would typically mean that the measurement/averaging period would begin only after the flowing mixture has obviously hit the sensor and where the EC values are fairly stable. The preferred embodiment would also have this measurement done on a regular basis. Oftentimes there will be a weekly cleaning event where everything is cleaned and sanitized (internal lines/tubes and fittings, as well as blender blades and shaft, etc.). One embodiment has an EC measurement, and subsequent ECDR Associate Step, performed as part of—or just before/after—this weekly cleaning event. The resulting DR obtained will allow the machine to take appropriate action if necessary. A DR value corresponding to concentrations below acceptable limits for the chemical may, for example, cause a lockout of the machine, or a message to replace the chemical as soon as possible, etc. In other embodiments, such a finding will result in a voltage adjustment to the chemical pump. These latter embodiments are disclosed hereinafter.

Chemical Flowrate Adjustment to Maintain Dilution Ratio

One embodiment of the invention uses the measured EC value—along with a measured total flow rate $Q_{tot}$ and certain other parameters—to change the chemical pump flow rate $Q_{chem}$ by adjusting the applied voltage to said pump. This may, for example, be done periodically (e.g., during each daily or weekly cleaning event) to try and keep the DR at its desired/nominal value. The DR could theoretically vary due to things like degradation/fatiguing of the tubing (if a peristaltic pump is used), degradation of the pump itself, or changes in the raw chemical (i.e., from one batch to another).

The main equation needed for this "chemical flow adjustment" process is the one governing the very definition of Dilution Ratio. Realizing that the "total flow" contains both the motive/water flow and the tiny chemical flow, we have the basic equation:

$$\text{Dilution Ratio} = \frac{Q_{tot} - Q_{chem}}{Q_{chem}}$$

The above equation will be referred to herein as the Dilution Ratio Equation. EC would be measured by the EC/TDS sensor, along with the total flowrate $Q_{tot}$. Alternatively, the total flowrate could be measured by a separate sensor located in series, for instance, a flow meter. The "measured" $Q_{chem}$ is determined indirectly, and we also have a nominal/desired $Q_{chem}$, which is referred to herein as $Q_{chem\text{-}nom}$. This is the pre-established desired flowrate generated by the chemical pump, and typically associated with some nominal applied voltage to the pump, $V_{nom}$. This desired/nominal pump flow rate and associated voltage would be determined during the design process. They are what is required to achieve the desired Dilution Ratio for one or more of the possible flow paths. The steps in this embodiment would be:

Step 1—Measure total flow rate $Q_{tot}$ and an average electrical conductivity $EC_{mea}$.

Step 2—Obtain $DR_{mea}$ from $EC_{mea}$ via an ECDR Associate Step.

Step 3—Use the Dilution Ratio equation, with $Q_{tot}$ that was measured in Step 1, and using the desired/nominal value of chemical flow rate, $Q_{chem\text{-}nom}$. The result is the expected DR value, $DR_{exp}$.

Step 4—Calculate $DR_{mea}$ minus $DR_{exp}$, herein calling it Delta_DR. If it is positive, then more chemical flow—and thus pump voltage—is required to hit $DR_{exp}$. If it is negative, then less chemical flow—and thus less pump voltage—is required.

Step 5—Calculate the DR_PerCentDiff as:

$$\text{DR\_PerCentDiff} = \left[\frac{\text{Delta\_DR}}{DR_{exp}}\right] \times 100$$

Step 6—If DR_PerCentDiff is positive and greater than some threshold (e.g., 10%), then further calculations will be done to determine how much additional pump voltage is required. If DR_PerCentDiff is negative and has an absolute value greater than some threshold (e.g., 10%), then further calculations will be done to determine by how much the pump voltage needs to be reduced. In either case, we move to Step 7. If the absolute value of DR_PerCentDiff is less than some threshold (e.g., 10%), then no pump voltage adjustment is necessary, and the remaining steps are skipped.

Step 7—$DR_{mea}$ is plugged into the Dilution Ratio equation as the Dilution Ratio term, along with $Q_{tot}$. $Q_{chem}$ is then solved for. This is the apparent or "measured" flow rate of chemical being injected into the motive flow. Calculate the difference $Q_{chem\text{-}nom} - Q_{chem}$.

Step 8—The pump flow rate has already been characterized as a function of applied voltage (which could also be an equivalent voltage based on Pulse Width Modulating (PWM) techniques). In all cases herein, the term voltage may also mean an equivalent voltage based on PWM'ing at the appropriate duty cycle. If the relationship between $Q_{chem}$ and Voltage is essentially linear, then the slope of the $Q_{chem}$ VS Voltage graph is used with the difference in Step 7 to obtain the required change in voltage (Delta V) that will push the Dilution Ratio back to its approximate expected/nominal value. If the relationship is not linear, then the instantaneous slope would be used. That is, the first derivative of the $Q_{chem}$ VS Voltage function, at the point on the curve corresponding to the measured $Q_{chem}$, would be used. In either case, this first derivative or slope will be referred to as Slope_$Q_{chem}$_V. The resulting DeltaV is obtained by dividing the difference of Step 7 by Slope_$Q_{chem}$_V.

If desired, those skilled in the art can easily convert this DeltaV into a factor that is simply multiplied by the design/nominal applied voltage to determine the latest, or "corrected", voltage to use.

The voltage adjustment technique described above is effective in bringing the DR level back towards its nominal value, regardless of the cause for the shift or drift. As disclosed, factors relating to unpredictable changes in the raw chemical concentration, a small leak, uncertainties in the particular pump's behavior, uncertainties in peristaltic tubing behavior, or degradation in pump or tubing behavior over time, may be the cause. Of course, any combination of the foregoing factors, or others not mentioned, could be the cause of shifts or drifts away from the nominal DR. Furthermore, the application of the new adjusted voltage could happen immediately, or it could be implemented during, for example, the next daily or weekly cleaning event.

The comparison and decision process of Steps 4 through 6 above will be referred to herein as a Dilution Ratio Comparison Step. There are other similar ways that those skilled in the art may come up with to make this comparison and decision to proceed with a voltage change. Obviously, if a low enough threshold is used, the adjustment would occur nearly every time the measurement and test process is implemented. One may prefer, on the other hand, that the measured DR be significantly different from the expected DR before a change is made. Ultimately, all foregoing embodiments are within the scope of this disclosure.

Measuring Dilution Ratio with a Temporarily Boosted Pump Voltage

Another embodiment of the invention incorporates an attempt to reduce the previously described effects brought on by unknown or unmeasured qualities of the city water being used by a particular machine. It is advantageous for this reason to perform the EC measurement of the mixture while the chemical flow rate is temporarily higher than it is during normal cleaning/sanitizing. The dilution ratios are thus temporarily lower than normal, meaning a higher percentage of chemical and a lesser percentage of water. The Dilution Ratio equation is then used to normalize the resulting DR value back to what it would theoretically have been if the pump flow rate (and voltage) had not been temporarily increased. The end result is a reduction of the effect—on the mixture's EC measurement—of unknown or unmeasurable qualities of the local water coming into the machine. In addition to this, it is generally a good idea to use one of the lower-flowing flow paths when this process is employed. In that way, not only is the chemical flow rate maximized, but the "motive" water flow rate is minimized. Both processes help reduce any unknown or unpredictable effects that the local water characteristics may have on the electrical conductivity of the resulting chemical mixture.

A list of steps for this "water minimization" method of determining the DR is as follows:

Step A—Having chosen a flow circuit (preferably one that is lower flowing) to perform the EC measurement on, bump the pump's input voltage to a level above and beyond its current nominal value, and possibly to its maximum level (e.g., 24 V).

Step B—Allow flow through this flow path, typically by opening a solenoid valve located somewhere in the path. We thus have higher-than-average levels of chemical now being injected into the flow stream of this path.

Step C—After a short time period (e.g., 2 or 3 seconds), when the flow and chemical conditions at the EC/TDS sensor may be considered "steady state", begin averaging the EC and $Q_{tot}$ values. Several seconds should preferably be allowed for the continuous stream of sampled $Q_{tot}$ and EC values to be averaged. The result of this will be an average $Q_{tot}$ value, along with a "24 V" average EC value. If a different "high" voltage were used, the name would reflect that value of course. This will be called herein $EC_{24}$.

Step D—Perform an ECDR Associate Step, which yields a Dilution Ratio corresponding to the temporarily high chemical/pump flow. Herein this will be called $DR_{24}$. It comes from the predetermined relationship between EC and DR as already described, mapping $EC_{24}$ to its corresponding Dilution Ratio.

Step E—Use the Dilution Ratio Equation to solve for $Q_{chem\text{-}24}$, the chemical flow rate that corresponds to the pump's temporarily higher chemical flow. Upon rearranging, this equation is:

$$Q_{chem,24} = \frac{Q_{tot}}{(DR_{24} + 1)}$$

Step F—Normalize the "24 Volt" pump flow to where it would have been if the pump was operating at its nominal voltage. Use the Slope_$Q_{chem}$_V parameter already discussed for this. Recall that Slope_$Q_{chem}$_V is the rate of change of the pump/chemical flow with respect to pump voltage. The equation to use is:

$$Q_{chem,mea,nom} = Q_{chem,24} - (\text{Slope\_}Q_{chem\_}V)(24 - V_{nom})$$

Where $V_{nom}$ is the nominal/design voltage for the pump, as described above. Since the slope parameter above is typically positive, one sees that $Q_{chem,mea,nom}$ is less than $Q_{chem,24}$, as would be expected.

Step G—Use the Dilution Ratio Equation to now determine the measured DR value (the DR that is thought to exist at this value of $Q_{tot}$, when the pump flow is nominal). The equation is:

$$DR_{mea,nom} = \frac{(Q_{tot} - Q_{chem,mea,nom})}{Q_{chem,mea,nom}}$$

The process of determining the nominal Dilution Ratio of a flowing mixture by first determining a "high voltage" pump/chemical flowrate, then normalizing it back to nominal-voltage conditions and then using the Dilution Ratio equation to get DR, is herein referred to as DR Normalization from temporary Pump Boost. This process is described just above in going from $Q_{chem,24}$ in Step E to $DR_{mea,nom}$ in Step G.

Closed-Loop Priming and Turbo-Boosted Priming

Other embodiments of the invention deal with issues related to priming of the chemical pump. For our purposes herein, a fully primed pump circuit is one that: 1) has cleaner/sanitizer liquid in contact with the pumping portion of the circuit, 2) has cleaner/sanitizer liquid continuously between the source of the liquid and the pump, and 3) has cleaner/sanitizer liquid continuously between the pump and the point where the chemical connects to the stream of motive water (the injection point). While there could be points along this flow circuit (particularly between the container and the pump) that still have pockets or slugs of air, as long as there are continuous streamlines of liquid flow—from source to injection point—when the pump is turned on, and a path to atmosphere is created in the Cleanable Circuit, the pump is considered fully primed.

These embodiments attempt to take full advantage of the onboard EC/TDS sensor. Feedback from the sensor allows the system to know when chemical has apparently made its way successfully into the motive flow. The steps for one embodiment of such an automated priming routine are as follows:

Step I—A solenoid valve of one of the Cleanable Circuits is activated, allowing the motive flow to pass through to the exit/atmosphere, Step II—The EC is measured continuously by the EC/TDS sensor for several seconds, with the EC values sampled over this time then averaged (resulting in $EC_{H2O}$). This is the electrical conductivity of the incoming water (i.e., base water), Step III—The cleaner/sanitizer pump is turned on, which begins to induce the liquid chemical towards the pump (if the line begins with little or no liquid) or pumps the liquid along towards the injection point (if the line begins already full of chemical), Step IV—The EC and flow rate $Q_{tot}$ are measured continuously by the EC/TDS sensor (or by the EC/TDS sensor and a separate flow sensor) for several seconds, a good average value obtained for each, Step V—If the average EC is a certain percentage (e.g., 15 to 20%) above $EC_{H2O}$, an ECDR Associate Step is performed with the average EC value, to obtain a latest DR. Otherwise, Step IV and Step V are repeated.

Step VI—The "expected" value of DR, $DR_{exp}$, is obtained straight from the Dilution Ratio equation, with $Q_{tot}$ from Step IV used for the $Q_{tot}$ term, and $Q_{chem\text{-}nom}$ used for the $Q_{chem}$ term.

Step VII—If the latest DR from Step V is sufficiently close to $DR_{exp}$ (e.g., within +/−25%), then the pump shuts off, as does the solenoid valve in the Cleanable Circuit. The priming is finished. If the DR is not sufficiently close to $DR_{exp}$, the priming continues (return to Step IV). If necessary, this will go on for some maximum time limit (e.g., 3 or 4 minutes). If priming is not complete by then, certain messages are given to the user/operator, so troubleshooting may begin, etc.

Note that the check in Step V is because the relationship between the EC and the DR of the chemical mixture is typically ill-defined when the solution is essentially all water (i.e., DR approaching infinity). This check ensures that the ECDR Associate Step is only done when DR is nowhere near infinity.

Another embodiment may have the cleaner/sanitizer pump—during priming—operate at a significantly higher (boosted) voltage than the nominal or design voltage. This may include running the pump at its maximum voltage. Boosting the applied voltage increases the pumping ability of the pump. Once liquid reaches the pump, its flow rate will also be significantly higher. As already described, this "boosted voltage" flow rate will be referred to as $Q_{chem\text{-}24}$. This minimizes the amount of time required to prime the pump, particularly in those situations where the line between the chemical source/container and the pump itself is largely filled with air at the beginning of the priming process.

Specific Use Case Examples

Figure 18B:
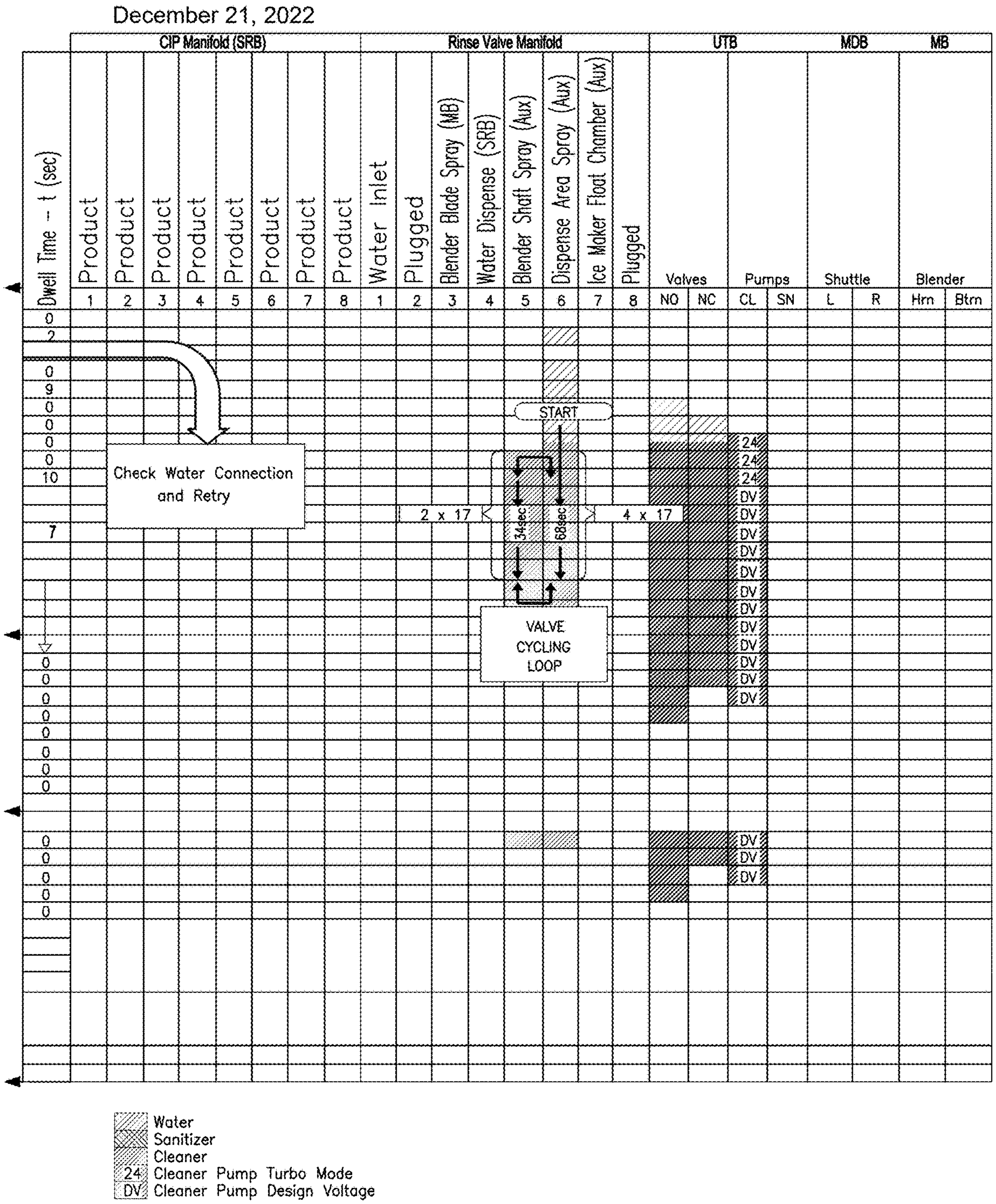
Figure 19B:
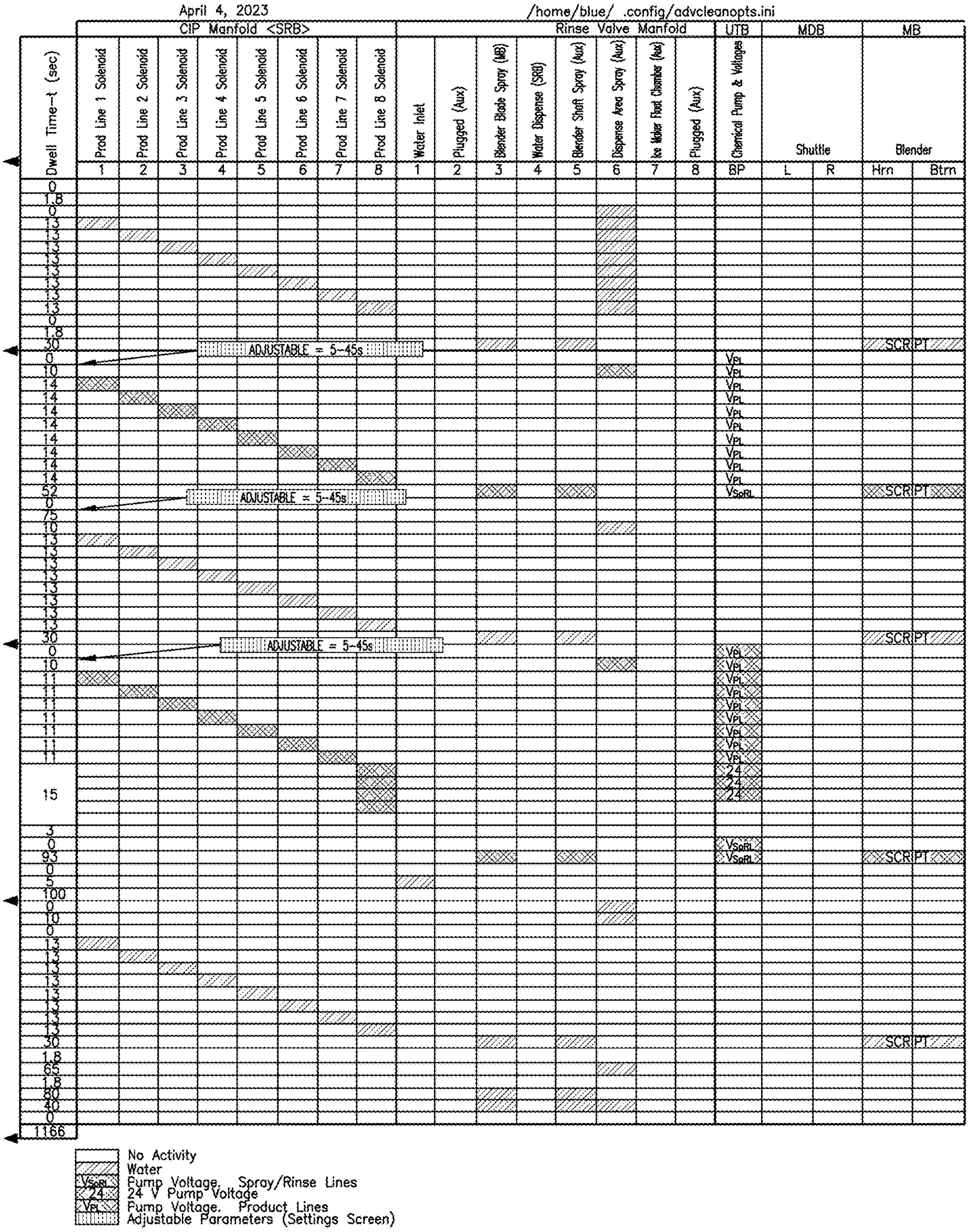

Example of a Beverage Dispenser with a Cleaning System and a Pump Utilizing a Priming Stera-Sheen Cleaner Solution is Shown in FIGS. 18A and 18B when Assembled with FIG. 18A to the Left and FIG. 18B to the Right, Constitute FIG. 18:

Example of a Beverage Dispenser with a Cleaning System and a Pump Performing a Weekly Cleaning Routine/Sequence is Shown in FIGS. 19A and 19B when Assembled with FIG. 19A to the Left and FIG. 19B to the Right, Constitute FIG. 19:

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made, and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure is not limited to the particular embodiment(s) disclosed as the best mode contemplated, but that the disclosure will include all embodiments falling within the scope of the appended claims.

What is claimed is:

1. A method of injecting at least one of a cleaning solution or a sanitizing solution into a cleanable portion of a beverage dispenser, wherein determining a dilution ratio (DR) of the cleaning solution or the sanitizing solution to water comprises the steps of:

a) injecting said cleaning solution or said sanitizing solution into an incoming stream of said water to form a mixture, the mixture flowing through the cleanable portion of the beverage dispenser;

b) measuring an electrical conductivity (EC) of the mixture to provide an EC value;

c) converting the EC value to the dilution ratio (DR) of the cleaning solution or the sanitizing solution; and d) using the DR to determine a quantity of said cleaning solution or said sanitizing solution used during an automatic, periodic cleaning of the portion of the beverage dispenser.

2. The method of claim 1, wherein determining the dilution ratio of the cleaning solution or the sanitizing solution to said water further comprises the steps of:

a) obtaining an EC reading of a base-water used to produce the mixture;
b) converting the EC reading of the base-water to a DR equivalent of the base-water; and
c) using the DR equivalent of the base-water to correct the EC of the mixture.

3. The method of claim 1 wherein a quantity of said water in the mixture is measured by steps comprising:
determining flow rate of said water used in the mixture;
averaging the flow rate over an interval of time to determine an average flow rate; and
multiplying the average flow rate by length of the interval of time.

4. The method of claim 1, wherein a quantity of said water in the mixture is measured by steps comprising:
determining flow rate of said water used in the mixture as a function of time during a time interval; and
integrating the flow rate over the time interval.

5. The method of claim 1, wherein a quantity of the cleaning solution or the sanitizing solution used in the mixture is determined by operating a pump that injects the cleaning solution or the sanitizing solution into the water.

6. A computer readable medium comprising computer instructions thereon for causing a microprocessor associated with said beverage dispenser to perform the steps of claim 1.

7. The method of claim 2, further comprising storing in a controller of the beverage dispenser the EC reading of the base-water.

8. The method of claim 2, further comprising retrieving from a database an EC of the base-water at a particular location.

9. The method of claim 5, wherein speed of operation of the pump is controlled to determine the quantity of the cleaning solution or the sanitizing solution in said mixture.

10. The method of claim 5, further comprising:
a. operating the pump at a higher applied voltage than a nominal voltage to determine the dilution ratio (DR);
b. measuring a total flow rate of the mixture through a cleanable circuit,
c. calculating a chemical flow rate of the mixture by utilizing the total flow rate of the mixture and the dilution ratio (DR) in a predefined equation, and
d. performing a dilution ratio (DR) normalization to convert the chemical flow rate of the mixture to a flow rate indicative of the pump operating at the nominal voltage, whereby effects of water quality on dilution ratio (DR) determination is minimized.

11. The method of claim 8, wherein the database further comprises a series of EC values of base-water at a number of geographic locations for possible use of the beverage dispenser; and the EC value of the base water corresponding to a location of use of the beverage dispenser being selected as an operative EC value of the base water.

12. The method of claim 8, wherein when the beverage dispenser is installed at a location not having an EC value of the base-water stored in the database, the EC value of the base water is measured by the beverage dispenser to determine a new EC value; and the new EC value is added to the database.

13. A method for cleaning and sanitizing portions of a beverage dispenser comprising:
sequentially rinsing with water of a series of cleanable ingredient circuits of the beverage dispenser;
spraying a blender assembly of the beverage dispenser with said water for a predetermined period of time;
sequentially cleaning or sanitizing with a mixture of water, and cleaning solution and/or a sanitizing solution the series of cleanable ingredient circuits;
spraying the blender assembly with said mixture;
allowing the blender assembly to soak with the mixture for a predetermined period of time;
determining an electrical conductivity value of said mixture while cleaning or sanitizing the beverage dispenser; and
utilizing the electrical conductivity value to determine an adjustment to its value to account for a variation of the electrical conductivity, when the mixture is flowing through the beverage dispenser.

14. The method of claim 13, wherein said spraying of the blender assembly comprises:
moving the blender assembly to position a shaft of the blender assembly to be sprayed; and
further moving the blender assembly to positioning a blade of the blender assembly to be sprayed.

15. The method of claim 13, further comprising preparing to deliver beverages after cleaning and/or sanitizing by priming the cleanable ingredient circuits with beverage ingredients.

16. The method of claim 13, further comprising spraying a beverage stage area of the beverage dispenser with water.

* * * * *